(12) United States Patent
Rajput et al.

(10) Patent No.: US 10,833,938 B1
(45) Date of Patent: Nov. 10, 2020

(54) METHODS, SYSTEMS, AND COMPUTER READABLE MEDIA FOR NETWORK FUNCTION (NF) TOPOLOGY SYNCHRONIZATION

(71) Applicant: Oracle International Corporation, Redwood Shores, CA (US)

(72) Inventors: Jay Rajput, Bangalore (IN); Virendra Singh, Bengaluru (IN); Rajiv Krishan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/527,988

(22) Filed: Jul. 31, 2019

(51) Int. Cl.
 H04L 12/00 (2006.01)
 H04L 12/24 (2006.01)
 H04L 29/08 (2006.01)
(52) U.S. Cl.
 CPC .......... H04L 41/0866 (2013.01); H04L 67/30 (2013.01); *H04L 67/02* (2013.01)
(58) Field of Classification Search
 CPC .............. H04J 306/79; H04W 56/0015; H04N 1/00347; H04L 69/32
 (Continued)

(56) References Cited

U.S. PATENT DOCUMENTS

| 6,725,278 B1 * | 4/2004 | Gonzalez | H04L 69/32 |
| | | | 709/217 |
| 7,151,945 B2 * | 12/2006 | Myles | H04J 3/0664 |
| | | | 455/502 |

(Continued)

FOREIGN PATENT DOCUMENTS

| WO | WO 2018/174021 A1 | 9/2018 |
| WO | WO 2018/174516 A1 | 9/2018 |

(Continued)

OTHER PUBLICATIONS

Notification of Transmittal of the International Search Report and the Written Opinion of the International Searching Authority, or the Declaration for International Application Serial No. PCT/US2019/053912 (dated Dec. 18, 2019).

(Continued)

*Primary Examiner* — Frantz Coby
(74) *Attorney, Agent, or Firm* — Jenkins, Wilson, Taylor & Hunt, P.A.

(57) ABSTRACT

A method for network function (NF) topology synchronization includes, at a network node including at least one processor, maintaining NF instance identifiers and corresponding NF profile version identifiers in an NF topology database local to the network node, the NF profile version identifiers indicating most current NF profile versions stored by the network node for each NF instance identifier. The method further includes obtaining a list of NF instance identifiers and NF profile version identifiers from an NF repository function (NRF), accessing the NF topology database, determining, by comparing the NF profile version identifiers in the list with NF profile version identifiers for corresponding NF instance identifiers in the NF topology database, whether the NF profiles stored by the network node are lagging behind the NF profiles stored by the NRF, and auditing or refraining from auditing the NRF for updated NF profiles based on results of the comparison.

20 Claims, 11 Drawing Sheets

(58) Field of Classification Search
USPC .............................. 709/223, 225, 226, 229
See application file for complete search history.

(56) References Cited

U.S. PATENT DOCUMENTS

| | | | | |
|---|---|---|---|---|
| 7,706,822 | B2* | 4/2010 | Emeott | H04W 56/001 |
| | | | | 455/502 |
| 8,306,034 | B2* | 11/2012 | Jang | H04W 48/08 |
| | | | | 370/395.3 |
| 8,620,858 | B2* | 12/2013 | Backholm | G06F 16/275 |
| | | | | 707/609 |
| 8,767,705 | B2* | 7/2014 | Goppner | H04J 3/0679 |
| | | | | 370/350 |
| 8,811,372 | B2* | 8/2014 | Li | H04W 56/0015 |
| | | | | 370/350 |
| 8,824,449 | B2* | 9/2014 | van der Wateren | H04J 3/0655 |
| | | | | 370/350 |
| 9,386,551 | B2* | 7/2016 | Zhou | H04W 40/12 |
| 10,299,128 | B1 | 5/2019 | Suthar et al. | |
| 10,361,843 | B1 | 7/2019 | Suthar et al. | |
| 10,595,256 | B1 | 3/2020 | Marupaduga et al. | |
| 10,609,154 | B2 | 3/2020 | Talebi Fard et al. | |
| 10,616,934 | B2 | 4/2020 | Talebi Fard et al. | |
| 10,778,527 | B2 | 9/2020 | Assali et al. | |
| 10,791,044 | | 9/2020 | Krishan et al. | |
| 2004/0062278 | A1* | 4/2004 | Hadzic | H04L 29/06 |
| | | | | 370/503 |
| 2008/0165761 | A1* | 7/2008 | Goppner | H04W 56/001 |
| | | | | 370/350 |
| 2009/0006652 | A1* | 1/2009 | Kasatani | H04N 1/00347 |
| | | | | 709/248 |
| 2009/0024727 | A1* | 1/2009 | Jeon | H04L 61/00 |
| | | | | 709/223 |
| 2011/0078674 | A1 | 3/2011 | Ershov | |
| 2013/0029708 | A1 | 1/2013 | Fox et al. | |
| 2014/0075004 | A1* | 3/2014 | Van Dusen | G06F 16/90335 |
| | | | | 709/223 |
| 2014/0379901 | A1 | 12/2014 | Tseitlin et al. | |
| 2015/0039560 | A1 | 2/2015 | Barker et al. | |
| 2016/0352588 | A1 | 12/2016 | Subbarayan et al. | |
| 2018/0039494 | A1 | 2/2018 | Lander et al. | |
| 2018/0262592 | A1 | 9/2018 | Zandi et al. | |
| 2018/0324646 | A1 | 11/2018 | Lee et al. | |
| 2018/0343567 | A1 | 11/2018 | Ashrafi | |
| 2019/0045351 | A1 | 2/2019 | Zee et al. | |
| 2019/0075552 | A1 | 3/2019 | Yu et al. | |
| 2019/0116486 | A1 | 4/2019 | Kim et al. | |
| 2019/0116521 | A1 | 4/2019 | Qiao et al. | |
| 2019/0158364 | A1 | 5/2019 | Zhang et al. | |
| 2019/0173740 | A1 | 6/2019 | Zhang et al. | |
| 2019/0174561 | A1 | 6/2019 | Sivavakeesar | |
| 2019/0182875 | A1 | 6/2019 | Talebi Fard et al. | |
| 2019/0191348 | A1 | 6/2019 | Futaki et al. | |
| 2019/0191467 | A1 | 6/2019 | Dao et al. | |
| 2019/0223093 | A1 | 7/2019 | Watfa et al. | |
| 2019/0261244 | A1 | 8/2019 | Jung et al. | |
| 2019/0306907 | A1 | 10/2019 | Andreoli-Fang et al. | |
| 2019/0313236 | A1 | 10/2019 | Lee et al. | |
| 2019/0313437 | A1 | 10/2019 | Jung et al. | |
| 2019/0313469 | A1 | 10/2019 | Karampatsis et al. | |
| 2019/0335002 | A1 | 10/2019 | Bogineni et al. | |
| 2019/0335534 | A1 | 10/2019 | Atarius et al. | |
| 2019/0342921 | A1 | 11/2019 | Loehr et al. | |
| 2019/0349901 | A1 | 11/2019 | Basu Mallick et al. | |
| 2019/0357092 | A1 | 11/2019 | Jung et al. | |
| 2019/0380031 | A1 | 12/2019 | Suthar et al. | |
| 2019/0394624 | A1 | 12/2019 | Karampatsis et al. | |
| 2019/0394833 | A1 | 12/2019 | Talebi Fard et al. | |
| 2020/0008069 | A1 | 1/2020 | Zhu et al. | |
| 2020/0028920 | A1 | 1/2020 | Livanos et al. | |
| 2020/0045753 | A1 | 2/2020 | Dao et al. | |
| 2020/0045767 | A1 | 2/2020 | Velev et al. | |
| 2020/0053670 | A1 | 2/2020 | Jung et al. | |
| 2020/0053724 | A1 | 2/2020 | MolavianJazi et al. | |
| 2020/0053828 | A1 | 2/2020 | Bharatia et al. | |
| 2020/0059856 | A1 | 2/2020 | Cui et al. | |
| 2020/0084663 | A1 | 3/2020 | Park et al. | |
| 2020/0092423 | A1 | 3/2020 | Qiao et al. | |
| 2020/0092424 | A1 | 3/2020 | Qiao et al. | |
| 2020/0136911 | A1 | 4/2020 | Assali et al. | |

FOREIGN PATENT DOCUMENTS

| | | |
|---|---|---|
| WO | WO 2019/034609 A1 | 2/2019 |
| WO | WO 2019/220172 A1 | 11/2019 |
| WO | WO 2020/091934 A1 | 5/2020 |

OTHER PUBLICATIONS

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).

Commonly-assigned, co-pending U.S. Appl. No. 16/369,691 for "Methods, System, and Computer Readable Media for Handling Multiple Versions of Same Service Provided by Producer Network Functions (NFs)," (Unpubllshed, filed Mar. 29, 2019)

"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).

"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).

"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).

"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).

"5G; 5G System; Network function repository services; Stage 3 (3GPP TS 29.510 version 15.1.0 Release 15)," ETSI TS 129 510, V15.1.0, pp. 1-87 (Oct. 2018).

"5G; 5G System; Unified Data Repository Services; Stage 3 (3GPP TS 29.504 version 15.1.0 Release 15)," ETSI TS 129 504, V15.1.0, pp. 1-26 (Oct. 2018).

Mayer, "RESTful APIs for the 5G Service Based Architecture," Journal of ICT, vol. 6_1&2, pp. 101-116 (2018).

"Cisco Ultra 5G Packet Core Solution," Cisco, White Paper, pp. 1-11 (2018).

"5G Service Based Architecture (SBA)," 5G, pp. 1-61 (downloaded Dec. 24, 2018).

Preston-Werner, "Semantic Versioning 2.0.0," Oracle, pp. 1-5 (Jun. 2013).

Commonly-assigned, co-pending International Application No. PCT/US19/53912 for "Methods, Systems, and Computer Readable Media for Providing a Service Proxy Function in a Telecommunications Network Core Using a Service-Based Architecture," (Unpublished, filed Sep. 30, 2019).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

Scholl et al., "An API First Approach to Microservices Development," Oracle, https://blogs.oracle.com/developers/an-api-first-approach-to-microservices-development, pp. 1-12 (Nov. 8, 2017).

Non-Final Office Action for U.S. Appl. No. 16/176,920 (dated Mar. 6, 2020).

Commonly-assigned, co-pending U.S. Appl. No. 16/176,920 for "Methods, Systems, and Computer Readable Media for Providing a

(56) References Cited

OTHER PUBLICATIONS

Service Proxy Function in a Telecommunications Network Core Using a Service-Based Architecture," (Unpublished, filed Oct. 31, 2018).
"5G; Procedures for the 5G System (3GPP TS 23.502 version 15.2.0 Release 15)," ETSI TS 123 502 V15.2.0, pp. 1-46 (Jun. 2018).
Notice of Allowance and Fee(s) Due for U.S. Appl. No. 16/369,691 (dated May 12, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020)

\* cited by examiner

METHODS, SYSTEMS, AND COMPUTER READABLE MEDIA FOR NETWORK FUNCTION (NF) TOPOLOGY SYNCHRONIZATION

TECHNICAL FIELD

The subject matter described herein relates to NF topology synchronization. More particularly, the subject matter described herein relates to NF topology synchronization in 5G and subsequent generation networks in which consumer NFs, such as service communications proxies (SCPs) subscribed for producer NF topology information from an NF repository function (NRF).

BACKGROUND

In the 5G network architecture specified by the 3rd Generation Partnership Project (3GPP), the network function (NF) is a network node that provides or consumes services. NFs that provide services are called producer NFs. NFs that consume services are called consumer NFs. An NF can be a producer or a consumer depending on the context. The NF repository function (NRF) is the network entity that maintains the NF profiles of available NF instances and their supported services. The NRF also allows other NF instances to subscribe to and be notified regarding the registration in the NRF of new/updated producer NF service instances of a given type. The NRF supports service discovery functions by receiving NF discovery requests and providing information about available NFs.

The service communication proxy (SCP) is a node that can be used for indirect communications between consumer NFs and producer NFs. In indirect communications, consumer NFs send service requests to the SCP, the SCP selects a producer NF to handle each service request, and the SCP forwards the service requests to the producer NFs. The SCP also forwards responses from the producer NFs to the consumer NFs. The functionality of the SCP is described in 3GPP TS23.501, $3^{rd}$ Generation Partnership Project; Technical Specification Group Services and System Aspects; System Architecture for the 5G System; Stage 2 (Release 16), V16.0.0 (2019-03), the disclosure of which is incorporated herein by reference in its entirety.

Problems that can occur in a 5G network are that the NRF is unable to send an NF notification (due to network or software issues) or an NF consumer is unable to process an NF notification (due to transient hardware/software issues). This will cause the consumer NF topology information to be out of sync with NRF. To handle such problems, a consumer NF is required to audit every NF of which the consumer NF is aware to ensure that the NF topology information maintained by the consumer NF has the most recent topology information for each producer NF to which the consumer NF is subscribed. Due to the high number of producer NFs that may be present in the network, requiring such audits for every NF, even when the NF topology information maintained by the consumer NF or SCP is up to date, can unnecessarily waste network bandwidth and processing resources of NFs.

Accordingly, in light of these difficulties, there exists a need for NF topology synchronization.

SUMMARY

A method for network function (NF) topology synchronization includes, at a network node including at least one processor, maintaining NF instance identifiers and corresponding NF profile version identifiers in an NF topology database local to the network node, the NF profile version identifiers indicating most current NF profile versions stored by the network node for each NF instance identifier. The method further includes obtaining a list of NF instance identifiers and NF profile version identifiers from an NF repository function (NRF), accessing the NF topology database using the NF instance identifiers in the list, determining, by comparing the NF profile version identifiers in the list with NF profile version identifiers for corresponding NF instance identifiers in the NF topology database, whether the NF profiles stored by the network node are lagging behind the NF profiles stored by the NRF, auditing the NRF for updated NF profiles for NFs whose NF profiles stored by the network node are lagging behind the NF profiles stored by the NRF, auditing the NRF for NF profiles for NFs whose NF profiles are not stored by the network node and are present in the list, deleting the NF profiles that are stored by the networking node but are missing from the list, and refraining from auditing the NRF for updated NF profiles for NFs whose NF profiles stored by the network node are the same as or more current than the NF profiles stored by the NRF.

According to another aspect of the subject matter described herein, the network node comprises at least one of a consumer NF and a service communications proxy (SCP).

According to another aspect of the subject matter described herein, obtaining the list of NF instance identifiers and NF profile version identifiers from the NRF includes sending a GET/nf-instances message from the network node to the NRF and receiving the list of NF instance identifiers and NF profile version identifiers in response to the GET/nf-instances message.

According to another aspect of the subject matter described herein, receiving the list of NF instance identifiers and NF profile version identifiers includes receiving the list in a hypertext transfer protocol (HTTP) header.

According to another aspect of the subject matter described herein, auditing the NRF includes sending a GET/nf-instances message to the NRF specifying the NF instance identifiers of the NFs whose NF profiles are determined to be lagging behind the NF profiles stored by the NRF.

According to another aspect of the subject matter described herein, the method for NF topology synchronization includes detecting NF instance identifiers in the list that are not in the NF topology database and querying the NRF to obtain NF profiles for the NF identifiers in the list that are not in the NF topology database.

According to another aspect of the subject matter described herein, the method for NF topology synchronization includes detecting that the NF topology database includes NF instance identifiers that are not present in the list, and, in response, deleting records for the NF instance identifiers that are not in the list from the NF topology database.

According to another aspect of the subject matter described herein, the NF profile version identifiers comprise timestamps indicative of times of receipt of NF profiles by the NRF.

According to another aspect of the of the subject matter described herein, the method for NF topology synchronization includes maintaining, at the network node, a sync version that indicates a highest NF profile version number learned by the network node from an NF topology audit and wherein accessing the NF topology database using the instance identifiers in the list includes accessing the NF topology database using only NF instance identifiers that are greater than or equal to the sync version minus a tolerance According to another aspect of the subject matter described herein the method for NF topology synchronization includes maintaining, in the NRF, an NF topology database including NF instance identifiers and NF profile version identifiers that indicate the most current NF profile versions stored by the NRF.

According to another aspect of the subject matter described herein, a system for network function (NF) topology synchronization includes a network node including at least one processor. The system further includes an NF topology database local to the network node and storing NF instance identifiers and corresponding NF profile version identifiers, the NF profile version identifiers indicating most current NF profile versions stored by the network node for each NF instance identifier. The system further includes an NF topology synchronizer executed by the at least one processor for obtaining a list of NF instance identifiers and NF profile version identifiers from an NF repository function (NRF), accessing the NF topology database using the NF instance identifiers in the list, determining, by comparing the NF profile version identifiers in the list with NF profile version identifiers for corresponding NF instance identifiers in the NF topology database, whether the NF profiles stored by the network node are lagging behind the NF profiles stored by the NRF, auditing the NRF for updated NF profiles for NFs whose NF profiles stored by the network node are determined to be lagging behind the NF profiles stored by the NRF, and refraining from auditing the NRF for updated NF profiles for NFs whose NF profiles stored by the network node are the same as or more current than the NF profiles stored by the NRF.

According to another aspect of the subject matter described herein, the NF topology synchronizer is configured to obtain the list of NF instance identifiers and NF profile version identifiers from the NRF by sending a GET/nf-instances message from the network node to the NRF and receiving the list of NF instance identifiers and NF profile version identifiers in response to the GET/nf-instances message.

According to another aspect of the subject matter described herein, the NF topology synchronizer is configured to receive the list in a hypertext transfer protocol (HTTP) header.

According to another aspect of the subject matter described herein, the NF topology synchronizer is configured to detect NF instance identifiers in the list that are not in the NF topology database and querying the NRF to obtain NF profiles for the NF identifiers in the list that are not in the NF topology database.

According to another aspect of the subject matter described herein, the NF topology synchronizer is configured to detect that the NF topology database includes NF instance identifiers that are not present in the list, and, in response, delete records for the NF instance identifiers that are not in the list from the NF topology database.

According to another aspect of the subject matter described herein, the NF profile version identifiers comprise timestamps indicative of times of receipt of NF profiles by the NRF.

According to another aspect of the subject matter described herein, the NF topology synchronizer is configured to obtain the list of NF instance identifiers and NF profile version identifiers from an NF topology database maintained by the NRF.

According to another aspect of the subject matter described herein, a non-transitory computer readable medium having stored thereon executable instructions that when executed by a processor of a computer controls the computer to perform steps at a network node including at least one processor. The steps include maintaining network function (NF) instance identifiers and corresponding NF profile version identifiers in an NF topology database local to the network node, the NF profile version identifiers indicating most current NF profile versions stored by the network node for each NF instance identifier. The steps further include obtaining a list of NF instance identifiers and NF profile version identifiers from an NF repository function (NRF). The steps further include accessing the NF topology database using the NF instance identifiers in the list. The steps further include determining, by comparing the NF profile version identifiers in the list with NF profile version identifiers for corresponding NF instance identifiers in the NF topology database, whether the NF profiles stored by the network node are lagging behind the NF profiles stored by the NRF. The steps further include auditing the NRF for updated NF profiles for NFs whose NF profiles stored by the network node are lagging behind the NF profiles stored by the NRF. The steps further include refraining from auditing the NRF for updated NF profiles for NFs whose NF profiles stored by the network node are the same as or more current than the NF profiles stored by the NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
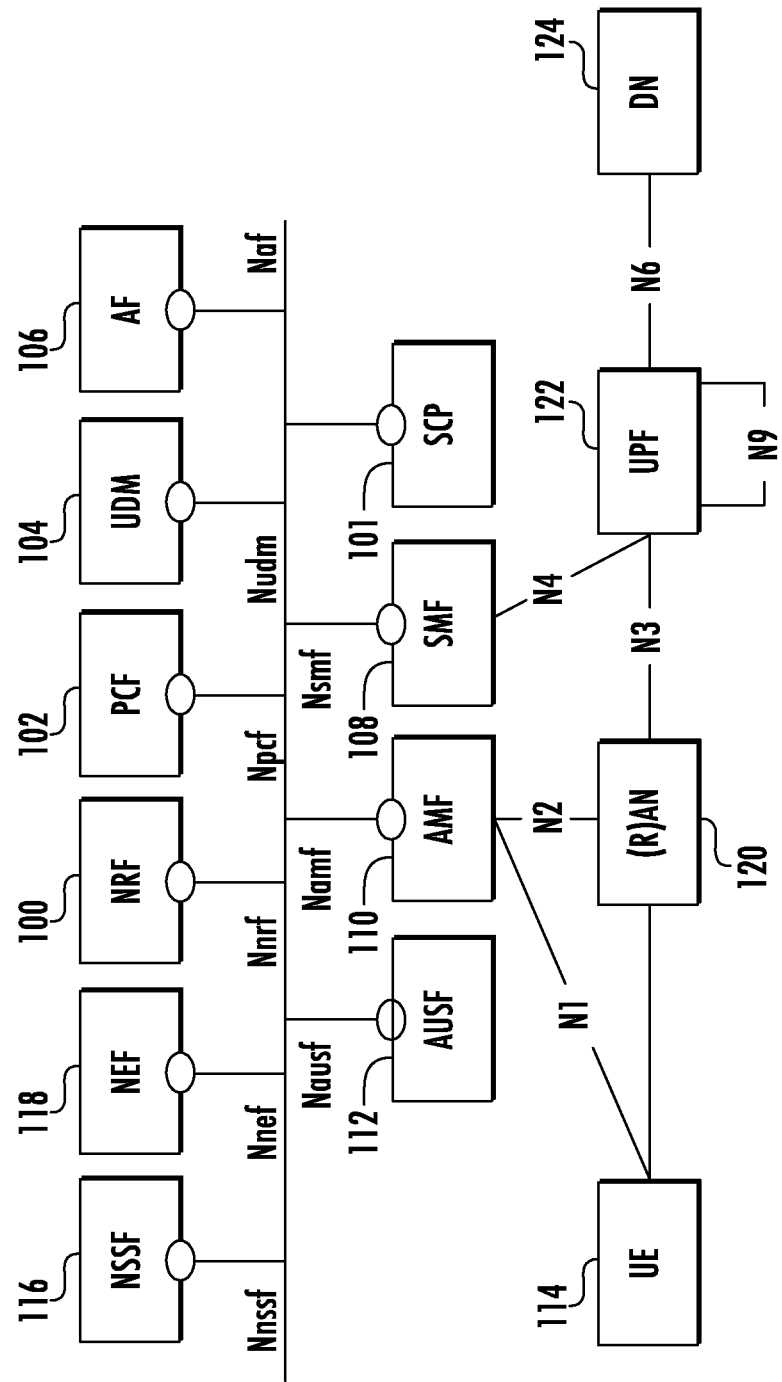
FIG. 1 is a network diagram illustrating an exemplary 5G network architecture including producer NFs, consumer NFs, an NRF, and an SCP.

The subject matter described herein relates to methods, systems, and computer readable media for NF topology synchronization. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF must obtain the NF profile from NRF 100. The NF profile is a JSON data structure defined in 3GPP TS29.510. Table 1 shown below illustrates attributes of the NF profile as defined in 3GPP TS. 29.510.

TABLE 1

NF Profile Definition

| Attribute name | Data type | P | Cardinality | Description |
|---|---|---|---|---|
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) |
| heartBeatTimer | integer | C | 0 . . . 1 | Time in seconds expected between 2 consecutive heart-beat messages from an NF Instance to the NRF. It may be included in the registration request. When present in the request it shall contain the heartbeat time proposed by the NF service consumer. It shall be included in responses from NRF to registration requests (PUT) or in NF profile updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | C | 1 . . . N | PLMN(s) of the Network Function (NOTE 7). This IE shall be present if this information is available for the NF. If not provided, PLMN ID(s) of the PLMN of the NRF are assumed for the NF. |
| sNssais | array(Snssai) | O | 1 . . . N | S-NSSAIs of the Network Function. If not provided, the NF can serve any S-NSSAI. When present this IE represents the list of S-NSSAIs supported in all the PLMNs listed in the plmnList IE. |
| perPlmnSnssaiList | array(PlmnSnssai) | O | 1 . . . N | This IE may be included when the list of S-NSSAIs supported by the NF for each PLMN it is supporting is different. When present, this IE shall include the S-NSSAIs supported by the Network Function for each PLMN supported by the Network Function. When present, this IE shall override sNssais IE. (NOTE 9) |
| nsiList | array(string) | O | 1 . . . N | NSI identities of the Network Function. If not provided, the NF can serve any NSI. |
| Fqdn | Fqdn | C | 0 . . . 1 | FQDN of the Network Function (NOTE 1) (NOTE 2). For AMF, the FQDN registered with the NRF shall be that of the AMF Name (see 3GPP TS 23.003 [12] clause 28.3.2.5). |
| interPlmnFqdn | Fqdn | C | 0 . . . 1 | If the NF needs to be discoverable by other NFs in a different PLMN, then an FQDN that is used for inter-PLMN routing as specified in 3GPP TS 23.003 [12] shall be registered with the NRF (NOTE 8). A change of this attribute shall result in triggering a "NF_PROFILE_CHANGED" notification from NRF towards subscribing NFs located in a different PLMN, but the new value shall be notified as a change of the "fqdn" attribute. |
| ipv4Addresses | array(Ipv4Addr) | C | 1 . . . N | IPv4 address(es) of the Network Function (NOTE 1) (NOTE 2) |
| ipv6Addresses | array(Ipv6Addr) | C | 1 . . . N | IPv6 address(es) of the Network Function (NOTE 1) (NOTE 2) |

TABLE 1-continued

NF Profile Definition

| Attribute name | Data type | P | Cardinality | Description |
| --- | --- | --- | --- | --- |
| allowedPlmns | array(PlmnId) | O | 1 . . . N | PLMNs allowed to access the NF instance.<br>If not provided, any PLMN is allowed to access the NF.<br>A change of this attribute shall not trigger a "NF_PROFILE_CHANGED" notification from NRF, and this attribute shall not be included in profile change notifications to subscribed NFs. |
| allowedNfTypes | array(NFType) | O | 1 . . . N | Type of the NFs allowed to access the NF instance.<br>If not provided, any NF type is allowed to access the NF.<br>A change of this attribute shall not trigger a "NF_PROFILE_CHANGED" notification from NRF, and this attribute shall not be included in profile change notifications to subscribed NFs. |
| allowedNf-Domains | array(string) | O | 1 . . . N | Pattern (regular expression according to the ECMA-262 dialect [8]) representing the NF domain names allowed to access the NF instance.<br>If not provided, any NF domain is allowed to access the NF.<br>A change of this attribute shall not trigger a "NF_PROFILE_CHANGED" notification from NRF, and this attribute shall not be included in profile change notifications to subscribed NFs. |
| allowedNssais | array(Snssai) | O | 1 . . . N | S-NSSAI of the allowed slices to access the NF instance.<br>If not provided, any slice is allowed to access the NF.<br>A change of this attribute shall not trigger a "NF_PROFILE_CHANGED" notification from NRF, and this attribute shall not be included in profile change notifications to subscribed NFs. |
| Priority | integer | O | 0 . . . 1 | Priority (relative to other NFs of the same type) in the range of 0-65535, to be used for NF selection; lower values indicate a higher priority. If priority is also present in the nfServiceList parameters, those will have precedence over this value. (NOTE 4).<br>The NRF may overwrite the received priority value when exposing an NFProfile with the Nnrf_NFDiscovery service. |
| Capacity | integer | O | 0 . . . 1 | Static capacity information in the range of 0-65535, expressed as a weight relative to other NF instances of the same type; if capacity is also present in the nfServiceList parameters, those will have precedence over this value. (NOTE 4). |
| Load | integer | O | 0 . . . 1 | Dynamic load information, ranged from 0 to 100, indicates the current load percentage of the NF. |
| Locality | string | O | 0 . . . 1 | Operator defined information about the location of the NF instance (e.g. geographic location, data center) (NOTE |
| udrInfo | UdrInfo | O | 0 . . . 1 | Specific data for the UDR (ranges of SUPI, group ID . . . ) |
| udmInfo | UdmInfo | O | 0 . . . 1 | Specific data for the UDM (ranges of SUPI, group ID . . . ) |
| ausfInfo | AusfInfo | O | 0 . . . 1 | Specific data for the AUSF (ranges of SUPI, group ID . . . ) |
| amfInfo | AmfInfo | O | 0 . . . 1 | Specific data for the AMF (AMF Set ID, . . . ) |
| smfInfo | SmfInfo | O | 0 . . . 1 | Specific data for the SMF (DNN's, . . . ) |
| upfInfo | UpfInfo | O | 0 . . . 1 | Specific data for the UPF (S-NSSAI, DNN, SMF serving area, interface . . . ) |
| pcfInfo | PcfInfo | O | 0 . . . 1 | Specific data for the PCF |
| bsfInfo | BsfInfo | O | 0 . . . 1 | Specific data for the BSF |
| chfInfo | ChfInfo | O | 0 . . . 1 | Specific data for the CHF |
| nrfInfo | NfInfo | O | 0 . . . 1 | Specific data for the NRF |
| customInfo | object | O | 0 . . . 1 | Specific data for custom Network Functions |
| recoveryTime | DateTime | O | 0 . . . 1 | Timestamp when the NF was (re)started (NOTE 5) (NOTE 6) |
| nfService-Persistence | boolean | O | 0 . . . 1 | If present, and set to true, it indicates that the different service instances of a same NF Service in this NF instance, supporting a same API version, are capable to persist their resource state in shared storage and therefore these resources are available after a new NF service instance supporting the same API version is selected by a NF Service Consumer (see 3GPP TS 23.527 [27]). |

TABLE 1-continued

NF Profile Definition

| Attribute name | Data type | P | Cardinality | Description |
|---|---|---|---|---|
| | | | | Otherwise, it indicates that the NF Service Instances of a same NF Service are not capable to share resource state inside the NF Instance. |
| nfServices | array(NF-Service) | O | 1 . . . N | List of NF Service Instances. It shall include the services produced by the NF that can be discovered by other NFs, if any. |
| nfProfile-Changes-SupportInd | boolean | O | 0 . . . 1 | NF Profile Changes Support Indicator. See Annex B. This IE may be present in the NFRegister or NFUpdate (NF Profile Complete Replacement) request and shall be absent in the response. true: the NF Service Consumer supports receiving NF Profile Changes in the response. false (default): the NF Service Consumer does not support receiving NF Profile Changes in the response. Write-Only: true |
| nfProfile-ChangesInd | boolean | O | 0 . . . 1 | NF Profile Changes Indicator. See Annex B. This IE shall be absent in the request to the NRF and may be included by the NRF in NFRegister or NFUpdate (NF Profile Complete Replacement) response. true: the NF Profile contains NF Profile changes. false (default): complete NF Profile. Read-Only: true |
| default-Notification-Subscriptions | array(Default-Notification-Subscription) | O | 1 . . . N | Notification endpoints for different notification types. (NOTE 10) |

NOTE 1:
At least one of the addressing parameters (fqdn, ipv4address or ipv6adress) shall be included in the NF Profile. If the NF supports the NF services with "https" URI scheme (i.e use of TLS is mandatory), then the FQDN shall be provided in the NF Profile or the NF Service profile (see clause 6.1.6.2.3). See NOTE 1 of Table 6.1.6.2.3-1 for the use of these parameters. If multiple ipv4 addresses and/or ipv6 addresses are included in the NF Profile, the NF Service Consumer of the discovery service shall select one of these addresses randomly, unless operator defined local policy of IP address selection, in order to avoid overload for a specific ipv4 address and/or ipv6 address.
NOTE 2:
If the type of Network Function is UPF, the addressing information is for the UPF N4 interface.
NOTE 3:
A requester NF may use this information to select a NF instance (e.g. a NF instance preferably located in the same data center).
NOTE 4:
The capacity and priority parameters, if present, are used for NF selection and load balancing. The priority and capacity attributes shall be used for NF selection in the same way that priority and weight are used for server selection as defined in IETF RFC 2782 [23].
NOTE 5:
The NRF shall notify NFs subscribed to receiving notifications of changes of the NF profile, if the NF recoveryTime or the nfStatus is changed. See clause 6.2 of 3GPP TS 23.527 [27].
NOTE 6:
A requester NF may consider that all the resources created in the NF before the NF recovery time have been lost. This may be used to detect a restart of a NF and to trigger appropriate actions, e.g. release local resources. See clause 6.2 of 3GPP TS 23.527 [27].
NOTE 7:
A NF may register multiple PLMN IDs in its profile within a PLMN comprising multiple PLMN IDs. If so, all the attributes of the NF Profile shall apply to each PLMN ID registered in the plmnList. As an exception, attributes including a PLMN ID, e.g. IMSI-based SUPI ranges, TAIs and GUAMIs, are specific to one PLMN ID and the NF may register in its profile multiple occurrences of such attributes for different PLMN IDs (e.g. the UDM may register in its profile SUPI ranges for different PLMN IDs).
NOTE 8:
Other NFs are in a different PLMN if they belong to none of the PLMN ID(s) configured for the PLMN of the NRF.
NOTE 9:
This is for the use case where an NF (e.g. AMF) supports multiple PLMNs and the slices supported in each PLMN are different. See clause 9.2.6.2 of 3GPP TS 38.413 [29].
NOTE 10:
If notification endpoints are present both in the profile of the NF instance (NFProfile) and in some of its NF Services (NFService) for a same notification type, the notification endpoint(s) of the NF Services shall be used for this notification type.

As can be seen from Table 1, the NF profile is a complex data structure and does not specify or include an NF profile version number or identifier. Parsing this data structure to detect whether the data structure is an updated profile version for an NF can consume NF processing cycles. In addition, transmitting this entire data structure of the network for every NF instance ID known to an NF can consume network bandwidth. The subject matter described herein avoids such difficulties using an NF instance ID and profile version number list communicated to an NF in an HTTP header and an NF topology database local to the NF and that includes NF instance identifiers and NF profile version numbers. A consumer NF or SCP that receives the list can access its local NF topology database to determine whether an NF profile audit is needed.

It should be noted that an NF profile version number or identifier, as described herein, is a number assigned by the NRF to identify a version of an NF profile stored by the NRF for easy comparison. The NF profile identifier is different from the API version identifier, which has a 3GPP-defined format and only identifies the API version use by an NF versus the NF profile version used by the NF.

In FIG. 1, any of the nodes can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function 106 that provides application services. The nodes illustrated in FIG. 1 further include a session management function (SMF) 108 that manages sessions between access and mobility management function (AMF) 110 and PCF 102. AMF 110 performs mobility management operations, similar to those performed by a mobility management entity (MME) in 4G networks. An authentication server function (AUSF) 112 performs authentication services for user equipments (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

As stated above, producer NFs register their NF profiles with the NRF. Consumer NFs can discover producer NFs that have registered to provide a specific service by obtaining the NF profiles from the NRF. Consumer NFs can communicate directly with NF service producer NFs. Alternatively, consumer NFs can communicate indirectly with producer NFs via the SCP. In direct communication, the consumer NF performs discovery of the target producer NF either by local configuration or via the NRF. The consumer NF then communicates directly with the target service producer NF. In indirect mode, the consumer NF sends service request messages to the SCP, and the SCP may perform service discovery and selection of a producer NF on behalf of a consumer NF.

One problem that can occur in 5G networks is that the network can be overwhelmed with topology audit traffic when consumer NFs or SCPs send messages to audit the NF profiles of producer NFs that are present in the network. For example, SCP 101 illustrated in FIG. 1 or any of the NFs illustrated in FIG. 1 may subscribe to NRF 100 for NF profile changes. If an NF profile changes, a notification message is sent by the NRF to the subscribing SCP or NF. The notification message contains the NF profile of the NF whose profile has changed. The SCP or NF stores the NF profile received in the notification message and creates or updates routing rules based on the profile. Over time, SCP 101 or a consumer NF can miss notification messages for many reasons. For example, the SCP or consumer NF may restart, the network may be unavailable or congested, etc. There is a need for the SCP or consumer NF to synchronize its NF topology information with the NRF periodically. Such synchronization is typically performed by the SCP or NF querying the NRF periodically for each NF profile stored by the NRF. Performing such queries for all NFs periodically can cause high network traffic and performance issues. Accordingly, there is a need to optimize the NF profile auditing process performed by an SCP or a consumer NF.

Figure 2:
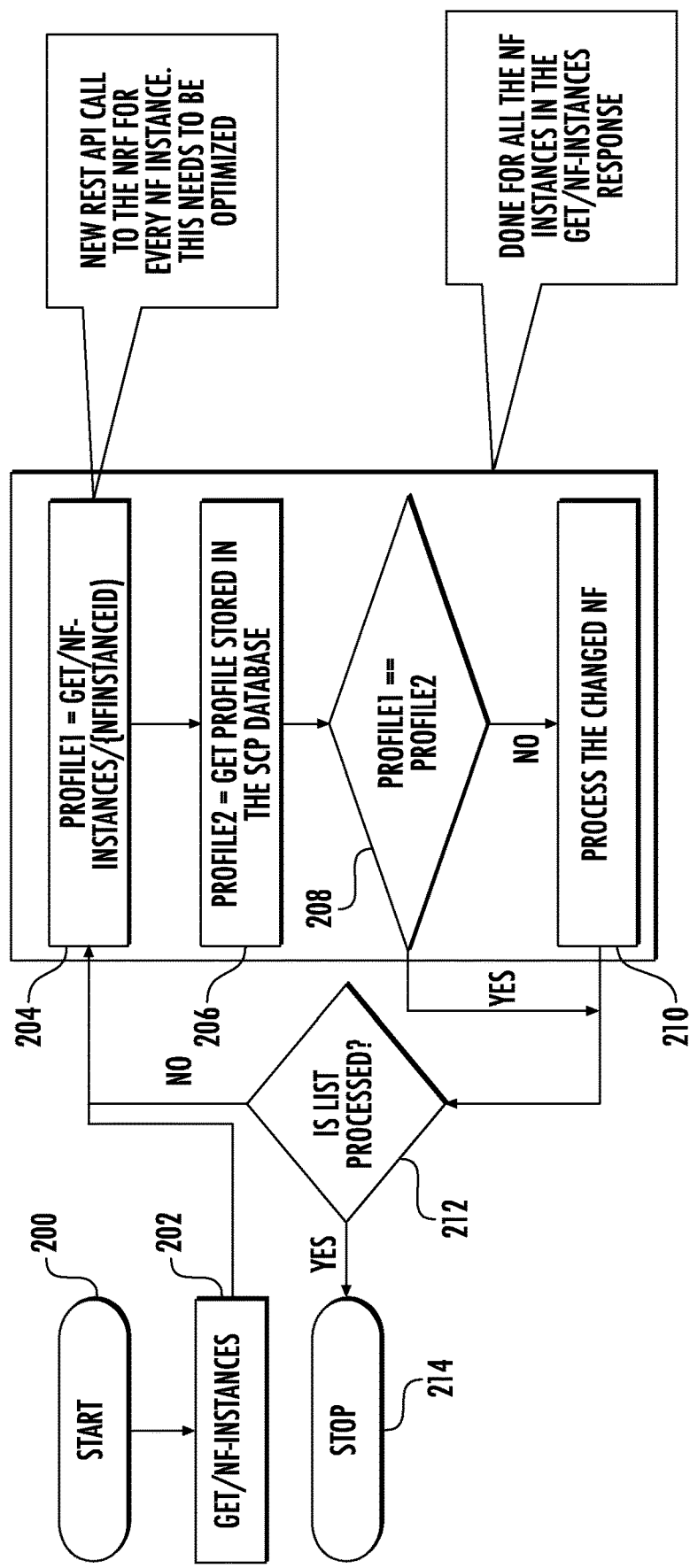
FIG. 2 is a flow chart illustrating exemplary non-optimized steps required for NF topology synchronization.

FIG. 2 is a flow chart illustrating an exemplary process for performing NF topology synchronization. As used herein, "NF topology synchronization" refers to the synchronization of NF profiles between an SCP or consumer NF and an NRF. Referring to FIG. 2, in step 200, the topology synchronization process starts. In step 202, the SCP or consumer NF initiates the GET/nf-instances process to obtain updated NF profiles from the NRF. In the GET/nf-instances process, the SCP or consumer NF queries the NRF for a list of producer NFs that have registered with the NRF. The NRF responds by providing a current list of NFs registered with the NRF. The list may include all NFs registered with the NRF, including the requesting NF.

In step 204, the SCP or consumer NF sets a variable called profile 1 equal to a first NF instance ID from the list obtained from the NRF and sends a representational state transfer (REST) application programming interface (API) call to the NRF for that instance. In step 206, the SCP or NRF sets a variable called profile 2 to the profile for the NF instance stored in the local SCP NF topology database.

In step 208, the SCP or consumer NF determines whether the profile retrieved from the NRF is the same as the profile obtained from the local database. This step may be performed by parsing the NF profiles to determine differences in the profiles, which can consume NF processing cycles. If the two NF profiles are not the same, control proceeds to step 210 where the SCP or consumer NF updates the NF profile stored in the local SCP database.

In step 212, the SCP or consumer NF determines whether the entire list of NF instances has been processed to determine whether any updates are needed. If there are no further updates needed, control proceeds to step 214 where the topology synchronization process starts. However, if the entire list has not been processed, control returns to step 204 where the next NF instance ID in the list is obtained, the NRF is queried, and the NF profile returned by the NRF is compared to the local NF profile stored in the SCP or consumer NF database. The process illustrated in FIG. 2 is performed for every NF instance in the NF instances response message received from the NRF. If the list contains hundreds or thousands of NFs, the processing capacity of the SCP or consumer NF may be consumed by the NF topology update process. In addition, auditing each NF profile known by an NF can network congestion due to the transport of the NF profiles over the network.

It is only necessary for the SCP or consumer NF to request NF profiles from the NRF if the NRF profile of an NF has been updated or if a new NF has been added. It may also be necessary for the SCP or consumer NF to have an efficient mechanism for determining if an NF profile has been deregistered with the NRF. If the NF profile has not been updated with the NRF, it is desirable for the SCP or consumer NF to avoid querying the NRF for updated profile information for the NF. In order to achieve this goal, the subject matter described herein includes a process where the NRF maintains NF profile version numbers for NF profiles stored by the NF and communicates the NF profile version numbers along with corresponding NF instance identifiers to the SCP or consumer NF. The SCP or consumer NF reviews the NF profile version numbers and NF instance identifiers received from the NRF and compares the NF profile version numbers to NF profile version numbers of corresponding NF instances in the NF topology database of the consumer NF or SCP. If the NF profile version numbers are the same or the NF profile version numbers in the NF topology database of the NF are greater, the consumer NF or SCP avoids querying the NRF for updated NF profiles for the NF instances. If the NF profile version numbers stored by the consumer NF or SCP are less than the NF profile version numbers received from the NRF, the consumer NF or SCP queries the NRF for the updated NF profiles.

In one implementation, the NF profile version is stored by the NRF as a number that is easily parsed and compared by consumer NFs or an SCP. This number is referred to herein as the NF profile version number or identifier. The NF profile version number or identifier is assigned to an NF profile by the NRF when the NRF receives a new or updated NF profile from an NF. In one example, the NF profile version number may be a timestamp that indicates time of receipt of a new or updated NF profile by the NRF. Timestamps increase with time, so an NF profile identifier with a larger timestamp will be determined to indicate an NF profile that is more current than an NF profile with a smaller timestamp. However, the subject matter described herein is not limited to using a timestamp as the NF profile version identifier. Any suitable numeric or alphanumeric value assigned by the NRF to distinguish between different NF profile versions may be used without departing from the scope of the subject matter described herein.

In one example, the NRF may communicate the NF profile version numbers to the consumer NF or SCP in a hypertext transfer protocol (HTTP) header of a notify message sent from the NRF to the SCP or consumer NF. The NF profile version numbers represent the NF profiles version of NFs received by the NRF in a notification message, for example, when a new NF registers with the network. The NRF management API GET/nf-instances response may provide an x-nf-topology-level HTTP header and x-nf-profiles HTTP header. The x-nf-topology-level HTTP header contains the list of NF instance IDs and NF profile version identifiers. The x-nf-profiles header provides the length or number of NF instances in the list provided by the x-nf-topology-level HTTP header.

Topology synchronization implemented by the consumer NF or SCP may make use of the NF profile version identifier to determine whether an NF profile has changed or not. If an NF profile is unchanged, the querying of the NRF for an updated NF profile can be avoided. If the NF profile is new or has been updated, the SCP or consumer NF will query the NRF for an updated or new NF profile as described above with regard to FIG. 2.

Whenever an NF registers (PUT), the NRF assigns a NF profile version number to that NF profile. The NF profile version number is not required to be unique across profiles of different NFs. Whenever an NF updates its profile (PATCH), the NRF updates the profile version number of that NF profile. The NF profile version number assigned must be higher than the version number assigned during the last operation on the NF profile, e.g., PUT/PATCH. However, the NF profile version number is not required to be sequential. As stated above, in one example, a timestamp may be used as the NF profile version number, because the timestamp is an available increasing number. Using a timestamp can provide up to millisecond granularity of NF profile version numbers. However, the NRF can implement any logic to assign and manage incremental version numbers for NF profile versions.

In a notification or response to a GET operation for a given NF instance, the NRF adds the NF profile version number as part of the HTTP header. The NF profile version number is also referred to herein as "x-nf-topology-level". For an HTTP "GET" all operation (i.e., GET/nf-instances), the HTTP header transmitted by the NRF in the response to the GET all operation contains a number that indicates the total number of NF profiles stored by the NRF and NF profile version numbers of all NFs being reported in the response. The list of NF instance identifiers and NF profile version numbers returned in the response is sorted in order of descending NF profile version number.

The consumer NF or SCP may perform the following operations upon receiving an NF notification from the NRF. For an NF_REGISTERED notification, upon successful processing of the notification, the consumer NF or SCP stores the NF profile version number of the reported NF instance (received in the HTTP header as part of notification message). The NF profile version number will be used during topology synchronization. For an NF_PROFILE_CHANGED notification, upon successful processing of the notification, the consumer NF or SCP will update the NF profile version number of the reported NF instance. For an NF_DEREGISTERED notification, upon successful processing of the notification, the consumer NF will delete the version details of the reported NF instance. Upon receiving a response to a GET operation for an individual NF, upon successful processing of the response, the consumer NF or SCP stores/updates the NF profile version number of each NF whose profile version number is received in the HTTP header as part of the response to the GET operation.

Figure 3:
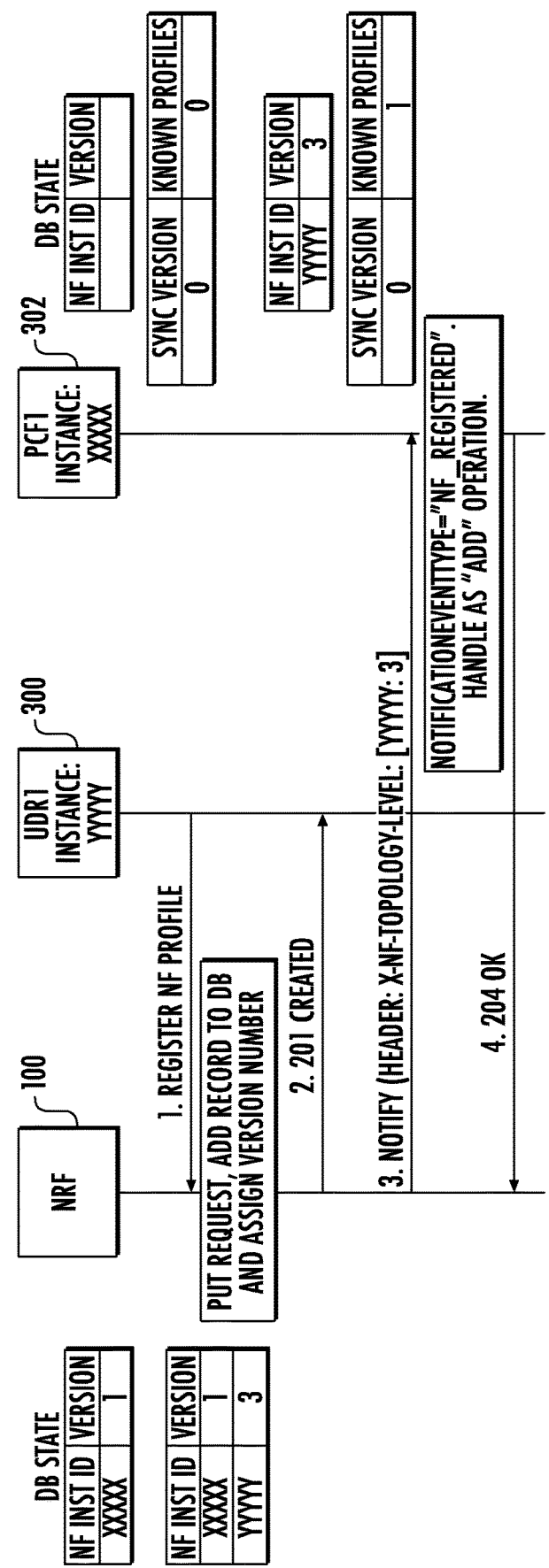
FIG. 3 is a message flow diagram illustrating an exemplary message exchange among an NRF, a consumer NF, and a producer NF for a new producer NF registration.

FIG. 3 is a message flow diagram illustrating exemplary handling of a new NF registration. In FIG. 3, it is assumed that a consumer NF, PCF1 302, has subscribed with NRF 100 to receive topology information for all NFs. It is also assumed that a new producer NF, UDR1 300, registers with NRF 100. It is further assumed that the initial state of the NF topology database maintained by NRF 100 includes one NF instance ID, XXXXX, with an NF profile version number of 1 and that the NF topology database of PCF1 302 initially has no NF topology information.

Referring to the message flow in FIG. 3, in line 1, UDR1 300 sends a register message to NRF 100 to register the NF profile of UDR1 300 with NRF 100. The register message includes a new profile for UDR1 300. The NF profile of UDR1 300 may have the attributes listed above in Table 1. In response to the register message, NRF 100 stores the NF profile for UDR1 300, assigns a profile version number to the profile received from UDR1 300, and adds an entry corresponding to the new profile for UDR1 300 to the NF topology database maintained by NRF 100. In the illustrated example, the NF instance ID for UDR1 300 is YYYYY, and the NF profile version number assigned to the received NF profile is 3. In line 2 of the message flow diagram, NRF 100 sends a 201 created message to UDR1 300 indicating that its NF profile has been stored by NRF 100.

In line 3 of the message flow diagram, NRF 100 sends a notify message to PCF1 302. The notify message includes the above described header with the x-nf-topology-level and the NF instance ID. In this example, the NF instance ID is YYYYY and the topology level is 3. In response to the notify message, PCF1 302 updates its local NF topology database to include the NF instance ID of YYYYY and the corresponding NF profile version number of 3. In line 4 of the message flow diagram, PCF1 302 sends a 204 OK message to NRF 100 confirming the updating of its NF topology database. Thus, after the steps illustrated in FIG. 3, PCF1 302 can use the topology version information to determine whether an NF profile version audit operation is required for UDR1 300.

It should also be noted from FIG. 3 that each consumer NF, such as PCF1 302, or SCP may maintain a variable called sync version, which is set to the highest NF profile version received from the NRF in response to an audit requested by an NF. Each consumer NF or SCP also maintains a variable called number of known profiles, which is equal to the total number of NF profiles known to the consumer NF or SCP from NF topology audit operations. In FIG. 3, PCF1 302 maintains the sync version variable at 0 after the notify message, because the notify message is not the result of an audit from PCF1 302. PCF1 302 updates the number of profiles variable to 1, indicating one known NF profile.

The sync version variable is used by the consumer NF to reduce the need to scan the entire list of NF instance IDs and profile version numbers received from the NRF. For example, as indicated above, the list of NF instance IDs and sync version numbers is sorted in order of descending NF profile version numbers. This means that the highest NF profile version numbers are at the top of the list. Each consumer NF stores that most current NF profile version number that it has in the sync version variable. When the NF receives the list of NF instance IDs and profile version numbers, the NF only scans the portion of the list with NF profile version numbers that are greater than or equal to the value of sync version (minus a tolerance that will be described below). The remaining portion of the list with NF instance IDs and NF profile version numbers that are less than the current value of sync version need not be scanned because these updates will have already been provided to the NF. By using the sync version to identify and scan only the portion of the list that has changed, the NF can avoid unnecessary comparisons and save processing cycles.

Figure 4:
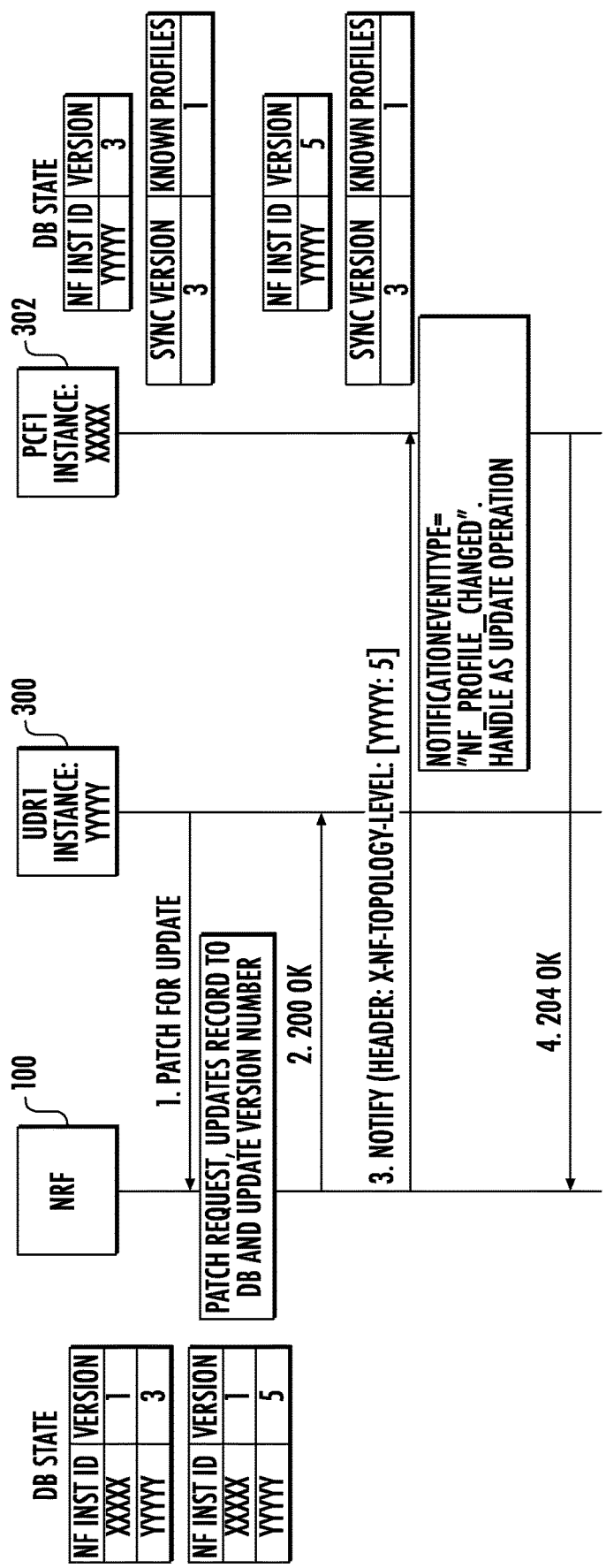
FIG. 4 is a message flow diagram illustrating an exemplary message exchange among an NRF, a consumer NF, and a producer NF for an update in producer NF profile version.

FIG. 4 is a message flow diagram illustrating exemplary handling of an NF update. In FIG. 4, it is assumed that the registration process in FIG. 3 has been performed, meaning that NRF 100 has notified PCF1 302 about the registration of UDR1 300. Referring to FIG. 4, in line 1, UDR1 300 sends a patch message to NRF 100 indicating that UDR1 300 has updated its NF profile. The patch message may contain the updated profile for UDR 300. NRF 100 stores the updated profile for UDR1 300 and assigns a new profile version number to the updated profile. In the illustrated example, the new NF profile version number for UDR1 300 is 5. In line 2, NRF 100 sends a 200 OK message to UDR1 300 indicating that the profile information in the local database of NRF 100 has been updated.

In line 3 of the message flow diagram, NRF 100 sends a notify message to PCF1 302 with the new NF profile version number for UDR1 300. In response to the notify message, PCF1 302 updates the NF profile version number of NF instance ID YYYYY in the local NF topology database of PCF1 302. In line 4 of the message flow diagram, PCF1 302 sends a 204 OK message to NRF 100 indicating that PCF1 302 received the notify message with the updated profile version number. PCF1 302 maintains the sync version variable at 3, because 3 is the highest sync version know from a topology audit. As indicated above, the sync version is not changed in response to a notify message.

Figure 5:
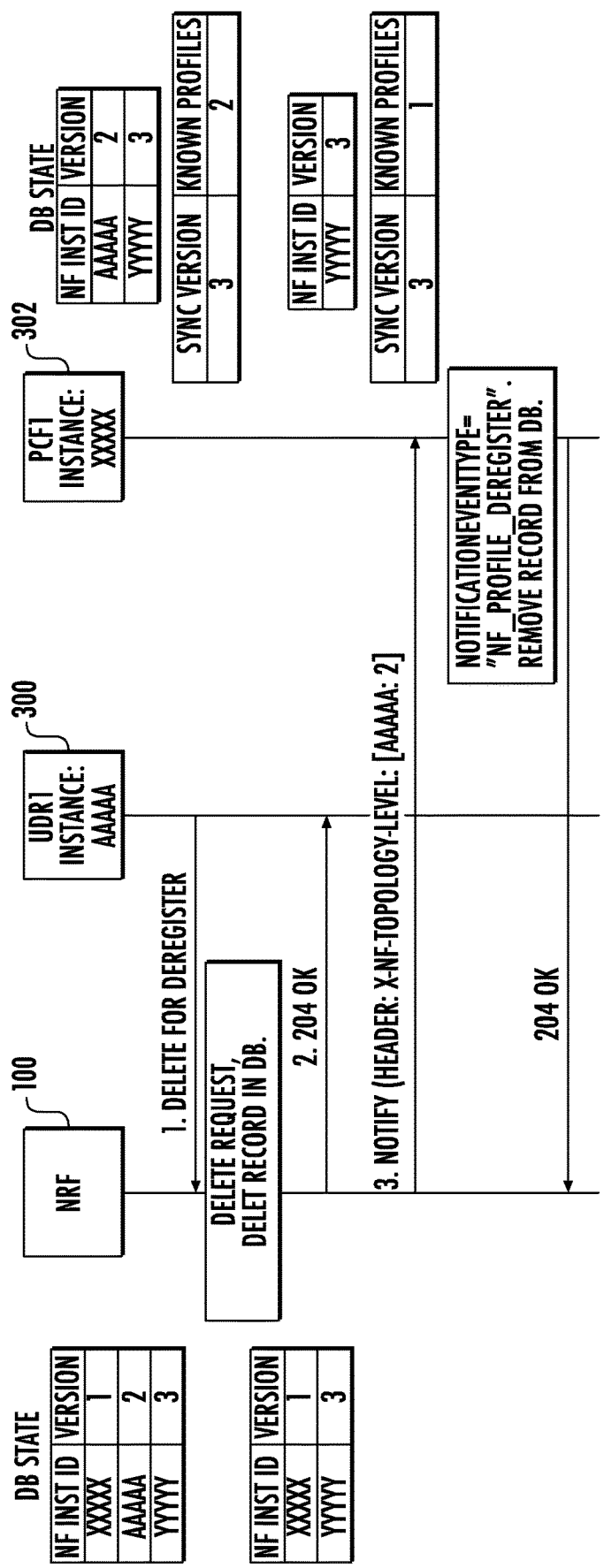
FIG. 5 is a message flow diagram illustrating an exemplary message exchange among an NRF, a consumer NF, and a producer NF for a producer NF deregistration.

As stated above, yet another case in which an NF profile synchronization may be required is when an NF deregisters itself with the NRF. FIG. 5 illustrates this case. In FIG. 5, it is assumed that NRF 100 has already notified PCF1 302 about the registration of two different UDRs, UDR1 and UDR2 that respectively have NF instance identifiers of AAAAA and YYYYY. In the illustrated example, UDR1 300, in line 1, deregisters itself from the network by sending a delete message to NRF 100. In response to the delete message, NRF 100 deletes the record for UDR1 300 from its NF topology database and deletes the corresponding NF profile.

In line 3, NRF 100 sends a notify message to PCF1 302. The notify message identifies the notification event type as an NF profile deregistration and contains the instance ID and the NF profile version number. In response to the notification message, PCF1 302 deletes the record for UDR1 300 from its NF topology database and deletes the corresponding NF profile. In line 4, PCF1 302 sends a 204 OK message to NRF 100. The 204 OK message confirms deletion of the record for UDR1 300 from the local NF topology database maintained by PCF1 302. After deleting the profile record for UDR1 300, PCF1 302 changes the number of known profiles variable from 2 to 1. The sync version variable remains at 3, because 3 is the highest profile version known by PCF1 302 from an NF topology audit.

Figure 6:
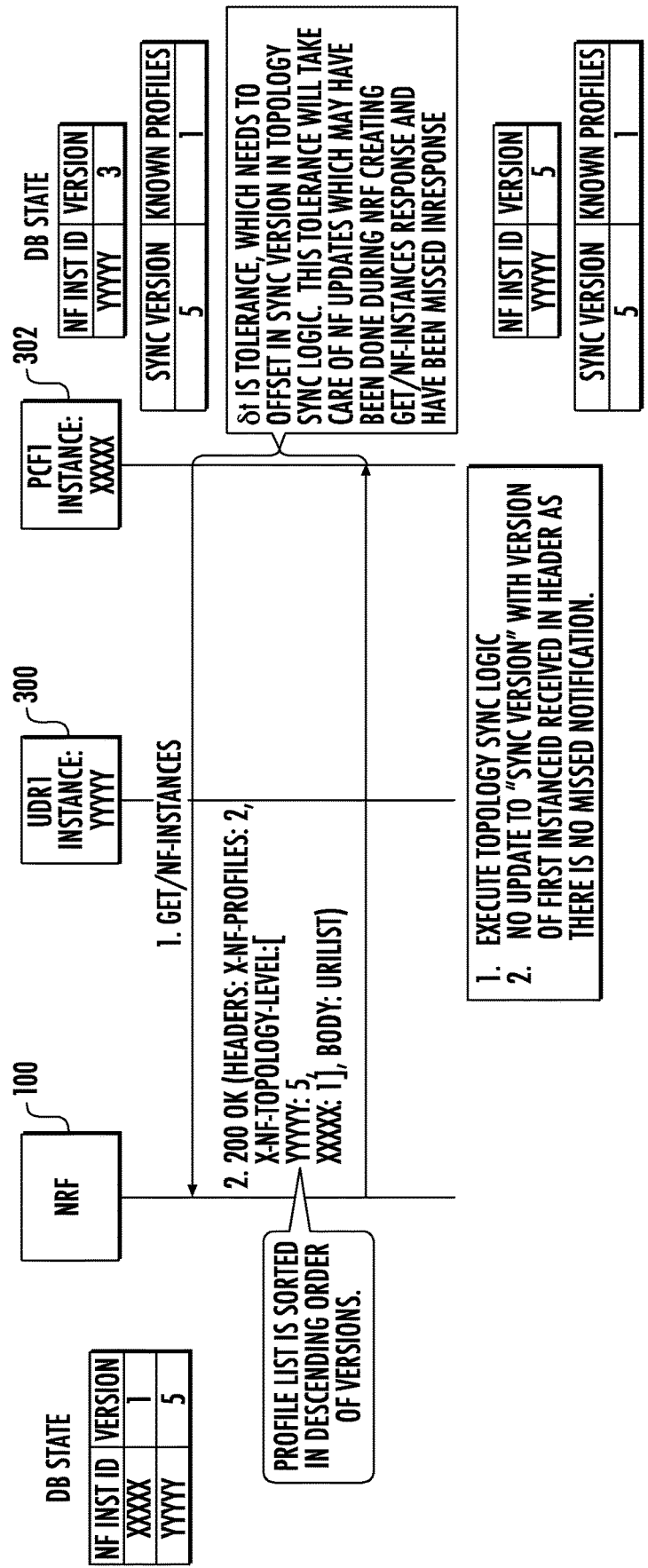
FIG. 6 is a message flow diagram illustrating an exemplary message exchange among an NRF, a consumer NF, and a producer NF for an NF topology synchronization when there is no change in producer NF profile version.

Once the consumer NF or SCP has NF profile version information, the consumer NF or SCP can use this information to determine whether or not an audit of an NF profile is required. FIG. 6 illustrates the case where an NF profile version audit is avoided because the consumer NF or SCP determines that there is no change in NF profile. Referring to FIG. 6, in line 1, PCF1 302 sends a GET/nf-instances message to NRF 100 to obtain a list of NF instances and their corresponding topology levels. In line 2, in response to the GET/nf-instances message, NRF 100 sends to PCF1 302 a message that includes a list of NF instance identifiers and corresponding NF profile version numbers. For each NF instance identifier in the list, PCF1 302 checks its local NF topology database. In this example, the only NF instance in the list (other than that of PCF1 302) is NF instance ID YYYYY and the only NF profile version number is 5. The NF profile version number for NF instance ID YYYYY in the local database of PCF1 302 is also 5. Because the stored NF profile version number in the local NF topology database of PCF1 302 is the same NF profile version number reported by NRF 100, PCF1 302 refrains from querying NRF 100 for an updated NF profile for UDR1 300.

As will be described in detail below, each consumer NF, such as PCF1 302, may maintain a variable, δt, which defines a tolerance used to handle the case when NF profiles are updated with the NF during the creation of the response to the GET/nf-instances message and the updated NF profile version numbers are not included in the response message. In FIG. 6, δt is equal to the difference in time between transmission of the GET/nf-instances message by PCF1 302 and receipt of the response to the GET/nf-instances message by PCF1 302. The use of the tolerance δt will be described below with respect to FIG. 7.

Figure 7:
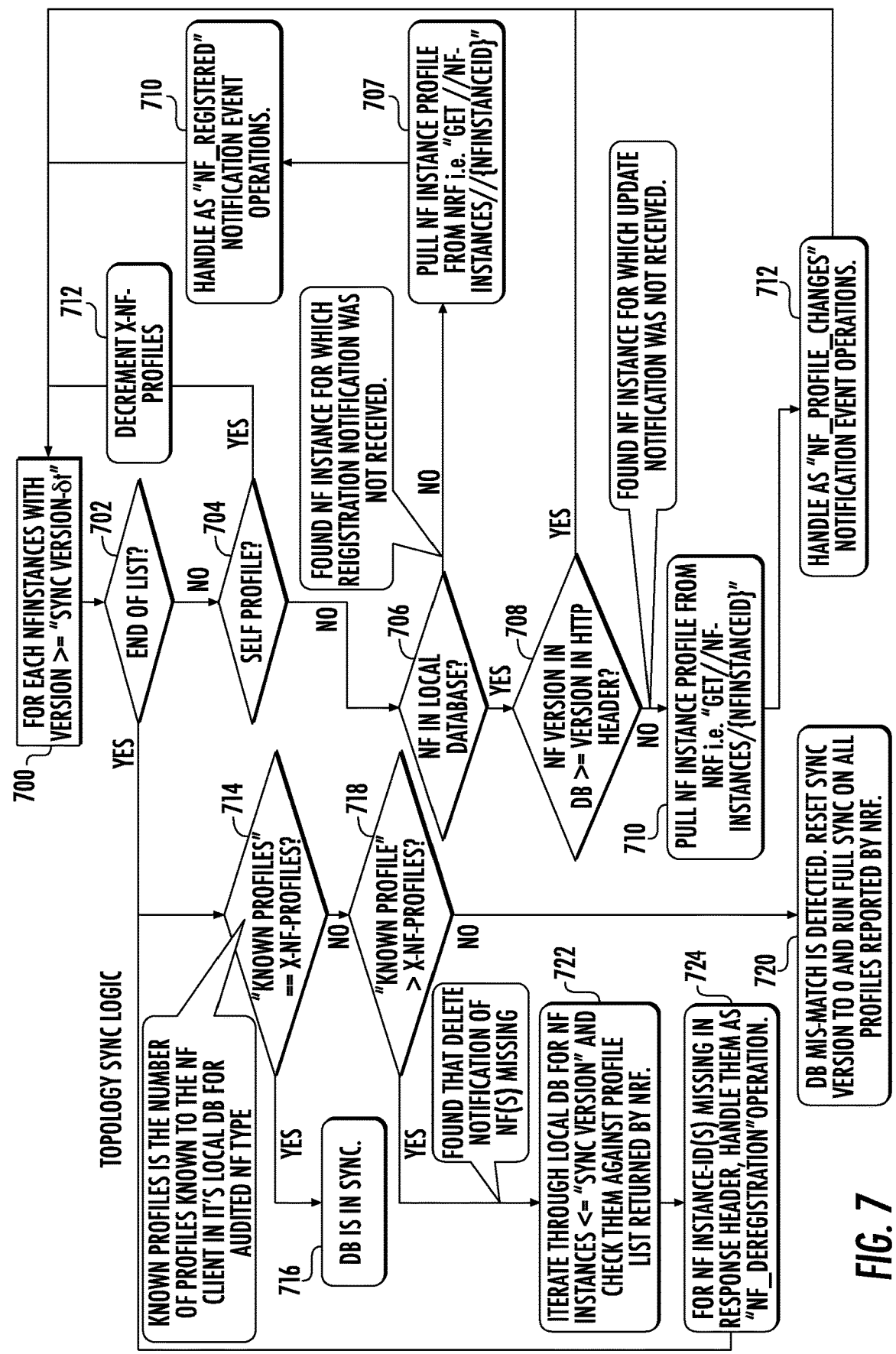
FIG. 7 is a flow chart illustrating an exemplary process that may be performed by a consumer NF or SCP for synchronizing producer NF topology.

FIG. 7 is an exemplary topology synchronization process that may be performed by a consumer NF or SCP. Referring to FIG. 7, in step 700, for each NF instance ID in the received list with an NF profile version number greater than or equal to sync version minus δt, the update process starts. The NF instances variable displayed in step 700 of the flow chart stores the NF instance IDs that are currently being tested from the list of NF instance IDs received from NRF 100. As stated above, sync version stores the highest NF profile version known to the consumer NF or SCP from a topology audit by the consumer NF or SCP, and δt is equal to the time between transmission of the GET/nf-instances message and receipt of the response message. In general, only entries in the list with NF profile version numbers greater than or equal to sync version need to be updated with the NF. The variable δt is used to handle the case where a profile version number is updated for the NF while the response to the GET/nf-instances message is being created by the NRF. For example, suppose NF profile version is 5 for a particular NF instance when the NF running topology synchronization procedure sends the GET/nf-instances message to the NRF but the NF profile version is updated to 7 because that particular NF sends a profile update message to the NRF while NRF is creating the response to the GET/nf-instances message. Suppose it takes 2 timestamp increments between the sending of the GET/nf-instances message to the NRF and receipt of the response to the GET/nf-instances message from the NRF. In this example, δt would be equal to 2. Since sync version is 7 and δt is 2, list entries with NF profile version numbers greater than or equal to 5 would be processed, which would allow for updates that occurred during the formulation of the response message to be processed by the NF.

In step 702, it is determined whether the end of the list has been reached. Here the list refers to the list of NF instance IDs and NF profile version numbers stored in NF instances variable in step 700. If the end of the list has not been reached, control proceeds to step 704 where it is determined whether the current profile instance ID being tested corresponds to the self profile of the analyzing consumer NF or SCP. There is no need to perform a topology update for one's own profile. If the profile is determined not to be a self profile, control proceeds to step 706 where it is determined whether the current NF instance identifier in the NF instances list received from the NRF is in the local NF topology database of the consumer NF or SCP.

If the NF instance identifier is in the local NF topology database, control proceeds to step 708 where it is determined whether the NF topology version number for the NF instance identifier in the local NF topology database is greater than or equal to the NF topology version number for the same NF instance identifier in the HTTP header of the response message received from the NRF. If the NF profile version number in the database is greater than or equal to the NF profile version number in the list, control returns to step 700 where the next entry in the list is processed.

If the two NF profile version numbers are not equal and NF profile version in the database is less than the version in the HTTP header, control proceeds to step 710 where the NF profile is pulled from the NRF. Pulling the NF profile from the NRF is performed by sending a GET message specifying the NF instance ID for the NF instance whose profile version is determined to be more current in the database maintained by the NRF than in the database maintained by the consumer NF or SCP. The NRF returns the NF profile, which may include the attributes illustrated above in Table 1. It is this step that the subject matter described herein is designed to avoid in the case where the NF profile version number in the NF topology database maintained by the consumer NF or SCP is greater than or equal to the NF profile version number maintained in the NF topology database stored by the NRF. After obtaining the updated profile from the NRF, control then proceeds to step 712 where the updating of the profile is handled as an NF profile changes notification event operation. Handling the updating of the profile as an NF profile changes notification event operation may include storing the updated profile for the NF in memory of the consumer NF or SCP and updating the NF profile version number in the NF topology database maintained by the consumer NF or SCP. After storing the updated profile and updating the associated variables in the NF topology database of the consumer NF or SCP in step 712, control returns to step 700 where the process is repeated for the next NF instance ID in the list received from the NRF.

Returning to step 706, if the NF instance ID is not in the local NF topology database of the consumer NF or SCP, then this means that an NF registration message was received by the NRF, but notification was not processed successfully by the consumer NF or SCP. Accordingly, control proceeds from step 706 to step 707 where the NF profile is pulled from the NRF. This pull operation is performed by the consumer NF or SCP sending a GET message to NRF 100, where the GET message specifies the NF instance whose profile is missing from the consumer NF or SCP. The consumer NF or SCP stores the NF profile. After storing the new NF profile, control proceeds to step 710 where the processing is handled as an NF registration notification event. The handling of an NF registration notification event is described above with respect to FIG. 3, where the consumer NF or SCP adds the NF instance identifier and NF profile version number to the NF topology database of the consumer NF or SCP. Control then returns to step 700 where the processing of the next entry in the list starts.

Returning to step 704, if the profile is determined to be a self profile, control proceeds to step 712 where the variable x-nf-profiles is decremented so that the self profile of an NF will not be counted as a new profile triggering an NF topology update. Control then returns to step 700 where the processing of the next item in the list begins.

In step 702, if it is determined that the end of list has been reached, control proceeds to step 714 where the variable known profiles is compared to the variable x-nf-profiles. Known profiles is the number of profiles known to NF client in its local NF topology database, and x-nf-profiles is the number of profiles in the list received from the NRF other than the self profile. If the number of known profiles is equal to x-nf-profiles, control proceeds to step 716 where the database is determined to be in sync. However, if the number of known profiles is not equal to the x-nf-profiles, control proceeds to step 718 where it is determined whether the number of known profiles is greater than x-nf-profiles. If the number of known profiles is greater than x-nf-profiles, control proceeds to step 720 where a database mismatch is detected. In this case, the sync version is reset to 0. A full sync is also run on all profiles reported by the NRF.

Returning to step 718, if the number of known profiles is greater than x-nf-profiles, control proceeds to step 722 where the consumer NF or SCP iterates through the local database for NF instance identifiers with NF profile version numbers that less than or equal to sync version and compares the NF instance identifiers with NF instance identifiers in the list returned by the NRF. Control then proceeds to step 724 where, for the NF instance identifiers missing in the list from the response header, the consumer NF or SCP handles the NF instance identifiers as an NF deregistration operation, which is described above with respect to FIG. 5 (entries corresponding to deregistered NFs are deleted from the local topology database of the NF or SCP). Once all the processing is complete, sync version is updated to the highest NF profile version.

Figure 8:
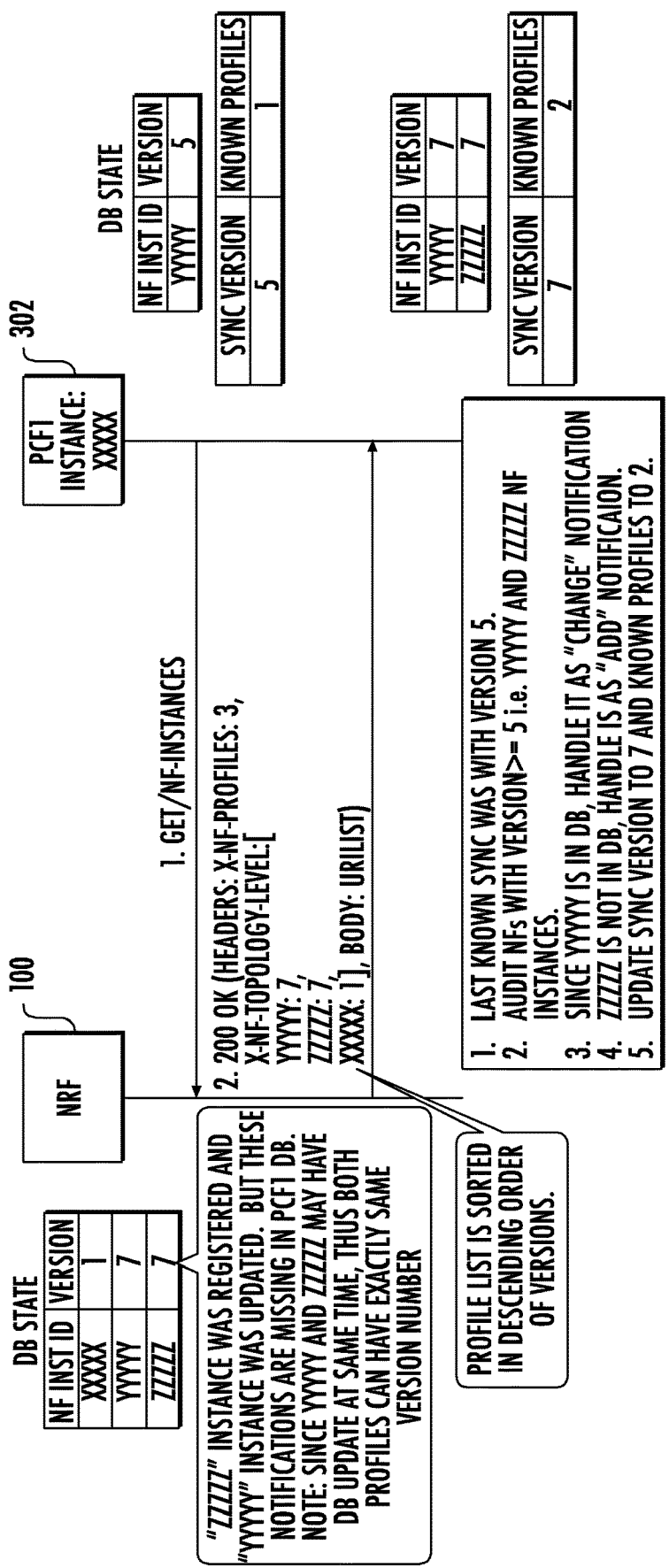
FIG. 8 is a message flow diagram illustrating an exemplary message exchange among an NRF, a consumer NF, and a producer NF for an NF topology synchronization when there is a change in producer NF profile version and an addition of a new NF profile to the NRF.

FIG. 8 is a message flow diagram illustrating exemplary handling of a topology sync when NF profile changes have occurred. In FIG. 8, it is assumed that NRF 100 has notified PCF1 302 of the NF profile for NF instance ID YYYYY, but since the notification, the NF profile version for NF instance ID YYYYY has been updated and a new NF profile for NF instance ID ZZZZZ has been registered with NRF 100.

Referring to the message flow in FIG. 8, in line 1, PCF1 302 sends a GET/nf-instances message to NRF 100. In line 2, NRF 100 sends a 200 OK message with NF profile IDs YYYYY and ZZZZZ. The NF profile version numbers for NF instance IDs YYYYY and ZZZZZ are both 7. PCF1 302 has a record in its local NF topology database for NF instance ID YYYYY. However, the version number is 5. Since the new NF version number for NF instance ID YYYYY is 7, PCF1 302 treats the new version as a change notification and updates the NF version number in its local topology database for instance ID YYYYY to 7. NF instance identifier ZZZZZ is not in the local NF topology database of PCF1 302, so PCF1 302 treats the notice as an add notification and adds an entry to its local NF topology database with NF instance identifier ZZZZZ and NF profile version 7. PCF1 302 updates its sync version to 7 and the number of known profiles to 2.

Figure 9:
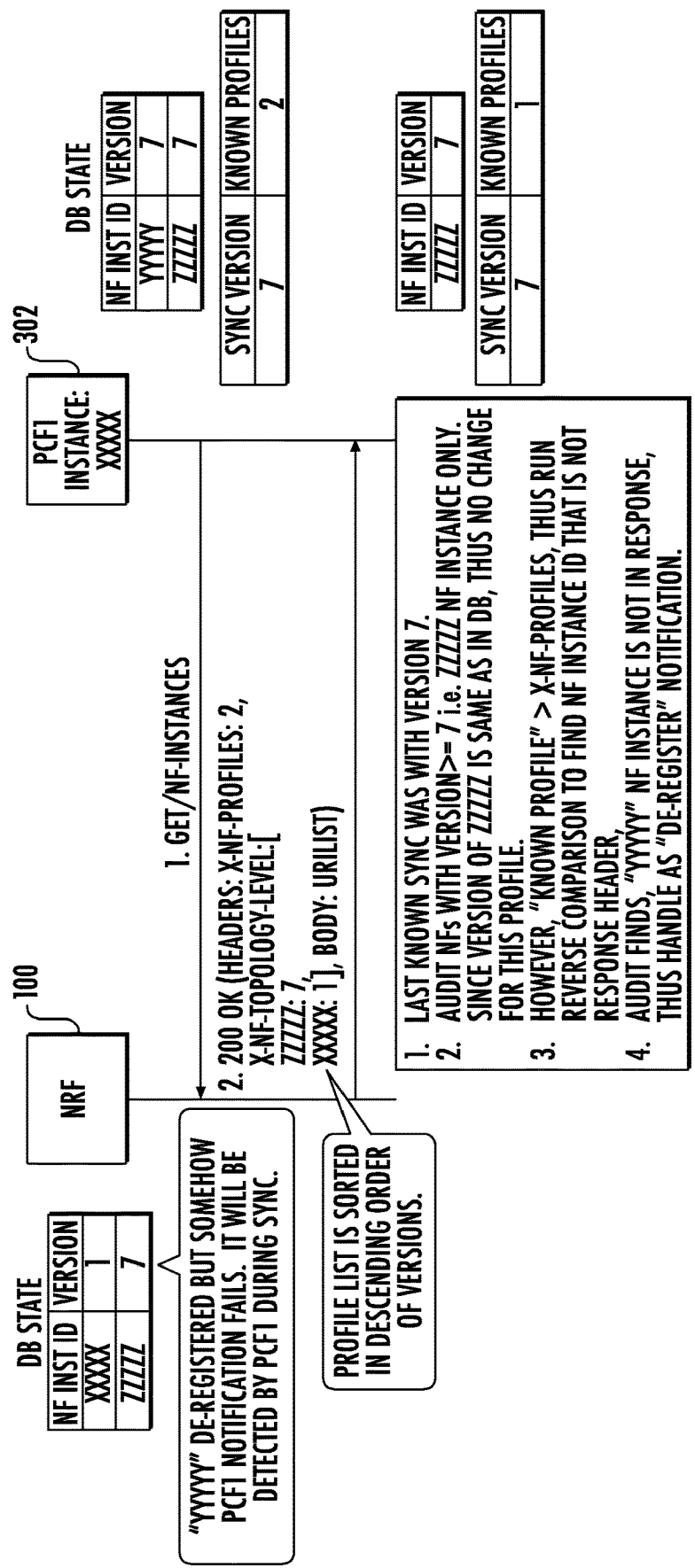
FIG. 9 is a message flow diagram illustrating an exemplary message exchange among an NRF, a consumer NF, and a producer NF for an NF topology synchronization when there has been a producer NF delete notification that was missed by the consumer NF (or SCP)

FIG. 9 is a message flow diagram illustrating operations performed by a consumer NF upon detecting missing delete notifications. Referring to FIG. 9, in line 1 of the message flow diagram, PCF1 302 sends a GET/nf-instances message to NRF 100. In this example, it is assumed that the NF instance ID YYYYY has been deregistered, but the notification was not received by PCF1 302. In line 2 of the message flow diagram, NRF 100 sends a 200 OK message containing NF instance identifiers ZZZZZ and XXXXX but not YYYYY. In response to receiving the message, because the last known sync version is 7, no NF profile audits are required. However, the number of known profiles is greater than x-nf-profiles, which means that the local topology database contains more NF profiles that the NF topology database of the NRF. The NF performs a reverse comparison of NF instance IDs in the local topology database of the NF to the list of NF instance IDs in the response message to locate the NF instances IDs that are not located in the response message. In this example, the NF determines that NF instance ID YYYYY is in the local topology database but not in the response from the NRF. Accordingly, PCF1 302 handles this as a deregister notification and deletes the record for NF instance YYYYY from its local topology database.

Figure 10:
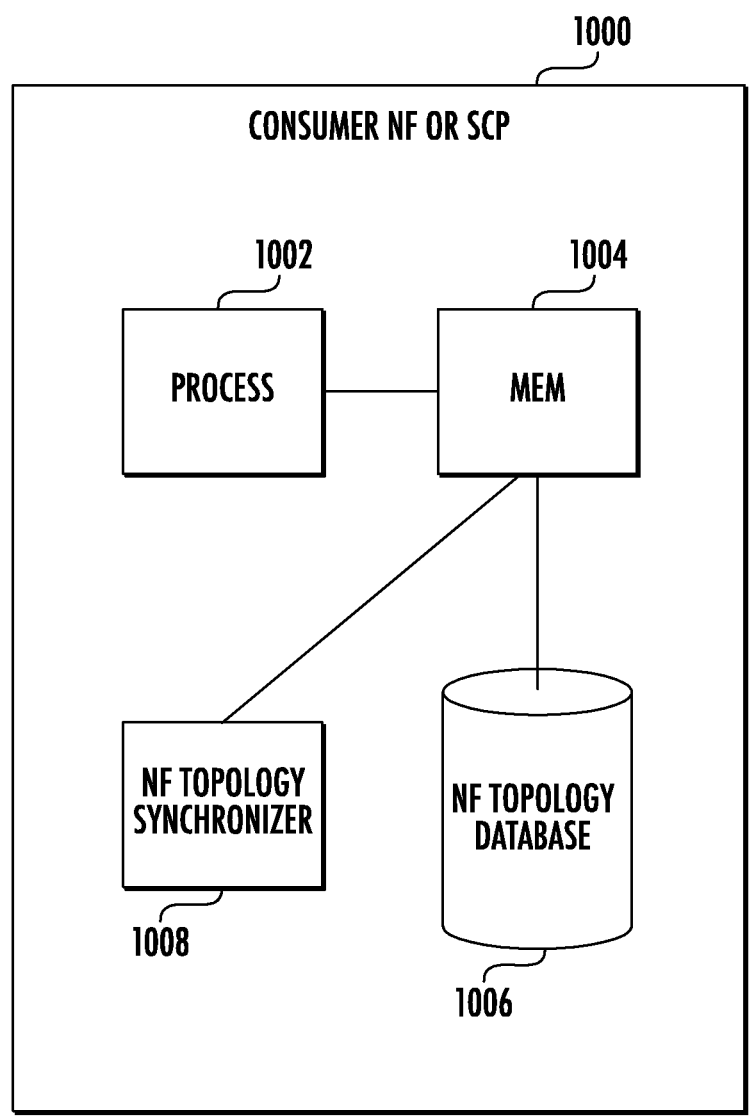
FIG. 10 is a block diagram of a network node with optimized NF topology synchronization capability.

FIG. 10 is a block diagram illustrating an exemplary consumer NF or SCP that implements NF profile version-controlled NF topology synchronization as described herein. Referring to FIG. 10, a consumer NF or SCP 1000 may be any of the NFs illustrated in FIG. 1 or an SCP. Consumer NF or SCP 1000 comprises a network node including at least one processor 1002 and a memory 1004. Consumer NF or SCP 1000 maintains an NF topology database 1006 that stores NF instance identifiers of which consumer NF or SCP 1000 has knowledge and corresponding NF profile version numbers for the NF instance identifiers. An NF topology synchronizer 1008 obtains lists of NF instance identifiers and corresponding NF profile version numbers from NRF 100, compares the NF profile version numbers received from the NRF with the NF profile version numbers for the corresponding NF instance identifiers in NF topology database 1006 and performs NF profile audits for NFs for which the NF profile version in topology database 1006 is less than the profile version received in the list of NF instances and for which the NF instance identifiers are not present in database 1006. If the NF profile version numbers in database 1006 indicate that the NF profile versions stored by network node 1000 are greater than or equal to the NF profile versions stored by the NRF, NF topology synchronizer refrains from performing NF profile audits for the corresponding NF instances.

Figure 11:
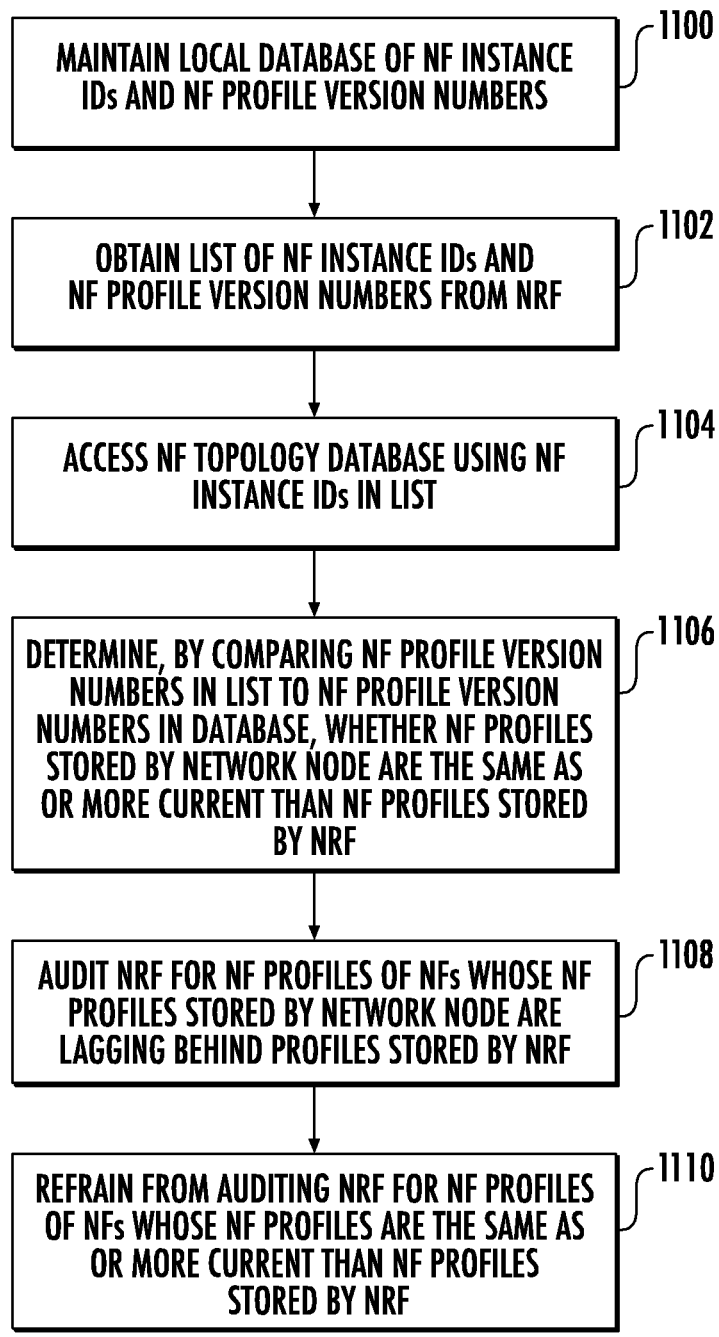
FIG. 11 is a flow chart of an exemplary process for optimized NF topology synchronization.

FIG. 11 is a flow chart illustrating an exemplary process for NF profile version-controlled NF profile auditing. The steps illustrated in FIG. 11 may be performed by a consumer NF or SCP. Referring to FIG. 11, in step 1100, a local database of NF instance IDs and NF profile version numbers is maintained. For example, a consumer NF or SCP may maintain in its memory a database of NF instance IDs and corresponding NF profile version numbers. In step 1102, a list of NF instance IDs and NF profile version numbers is obtained from the NRF. For example, a consumer NF, such as a PCF may obtain a list of NF instances and profile version numbers by sending a GET/nf-instances message to NRF 100.

In step 1104, the NF topology database is accessed using the NF instance identifiers in the list received from the NRF. For example, the NF may access its local NF topology database using each NF instance ID in the list to determine whether a corresponding record exists in the local NF topology database.

In step 1106, the NF determines, by comparing the NF profile version numbers in the list with NF profile version numbers in the database, whether the NF profiles stored by the NF are lagging behind NF profiles stored by the NRF. Instead of comparing the NF profiles themselves, which would be a processor-intensive operation, the NF compares the NF version numbers in the list received from the NRF with the NF version numbers for the corresponding NF instance IDs in the NF topology database.

In step 1108, the NF audits the NRF for NF profiles of NFs whose NF profiles stored by the NF are lagging behind the NF profiles stored by the NRF. Auditing the NRF may include pulling the updated profiles from the NRF.

In step 1110, the NF refrains from auditing the NRF for NF profiles of NFs whose NF profiles stored by the NF are the same as or more current than the NF profiles stored by the NRF. Rather than sending a GET message for every NF profile known to the NF, the NF selectively sends GET messages to the NRF for NF profiles that are known to have updated NF profiles that have not been communicated to the NF.

Thus, using the subject matter described herein, unnecessary auditing of the NRF for NF profiles that have not been updated is avoided. The need to parse entire NF profiles to detect a change is also avoided or at least reduced. Table 2 shown below illustrates exemplary network bandwidth and computing resource utilization with and without the proposed solution. In Table 2, it is assumed that the NRF returns a list of 1000 NF instance identifiers to the NF seeking to perform an NF topology synchronization and that transmission of each NF profile consumes 1 kilobyte of network bandwidth.

TABLE 2

Performance Comparisons with and without Version Controlled NF Profile Auditing

| Scenario | Without proposed solution | | With proposed enhancement | |
| --- | --- | --- | --- | --- |
| | Compute resource | Network Bandwidth | Compute resource | Network Bandwidth |
| No change in NF profile data | Iterate through all NF instance IDs in response message and get NF profile of each NF. Then | 1000K | Iterate through header in response message and compare with NF profile | 0K |

TABLE 2-continued

Performance Comparisons with and without Version Controlled NF Profile Auditing

| | Without proposed solution | | With proposed enhancement | |
|---|---|---|---|---|
| Scenario | Compute resource | Network Bandwidth | Compute resource | Network Bandwidth |
| | run AUDIT to find ADDED, DELETED and UPDATED profiles. AUDIT comparisons consume processing resources of NF. | | version numbers in local DB, will immediately indicate that profiles are in-sync with NRF. Save on JSON parsing of NF profile in response, Network bandwidth and logic to compare NF profiles (for any change). | |
| "X" new profiles | Iterate through all NF instance IDs in response message and compare NF instance IDs to NF profiles already received. This requires iterating all 1000 NF profiles to find "X" new profiles. | "X" * 1K | Sync logic iterates through HTTP header only to find that "X" NF profiles are not in local DB. Save on JSON parsing of data in response. | "X" * 1K |
| "X" updated profiles | Iterate through all NF instance IDs in response message and get profile data of each NF. Then run logic to compare received data with stored NF profiles. This requires requesting NF profile data of all 1000 NF profiles for comparison. | 1000K | Sync logic iterates through HTTP header only to find that "X" NF profiles have change in version number. Save on JSON parsing of data in response, Network bandwidth and logic to compare NF profiles (for any change). | "X" * 1K |
| "X" deleted profiles | Compare local DB to iterate through URI List to find NF instance that is missing. | 0K | Compares Local DB with "x-nf-topology-level" HTTP header to find NF instance that is missing. Save on JSON parsing of data in response. | 0K |

In the first row of Table 2, the scenario is where there is no change in NF profile data maintained by a consumer NF or SCP. Without the proposed solution, the consumer NF or SCP would query the NRF to check for an updated NF profile for each NF of which the consumer NF or SCP has knowledge. The consumer NF or SCP would then receive all 1000 NF profiles from the NRF and determine whether each profile is added, deleted, or updated, by comparing the profiles with those stored by the NF, which consumes network and NF processing bandwidth. With the proposed solution, the consumer NF or SCP would iterate through the header of the response to the GET/nf-instances message received from the NRF and compare the profile version numbers in the header to the NF profile version numbers stored in the local database of the consumer NF or SCP. For profiles whose version numbers indicate that the profiles are in sync, no further processing is required. In this example, it is assumed to be no change in the NF profile data. Accordingly, no network bandwidth is consumed by unnecessary querying of the NRF for updated profile information. NF processing resources are also conserved by eliminating the need to compare entire NF profiles with each other. Numeric comparisons of the NF profile version numbers are all that is required.

The second row in Table 2 illustrates the case where X new profiles have been communicated to the NRF. In this case, without the proposed solution, the consumer NF or SCP iterates through all NF instance identifiers received in a response message, obtains updated profiles from the NRF, and compares the updated profiles to the profiles stored in the local database of the consumer NF or SCP. With the proposed solution, the synchronization logic iterates through the HTTP header of the response message, locates profile versions that are not in the local database of the consumer NF or SCP, and queries the NRF for profile data for the X profiles determined to be new. The difference in performance is that without the proposed solution, the consumer NF or SCP iterates through all of its profiles to find X new profiles. With the proposed solution, the consumer NF or SCP can determine whether new NF instances exist by comparing the number of NF instance identifiers reported in the header of the response message to the number of NF instances variable maintained in the local NF topology database.

The third row in Table 2 illustrates the case where X updated profiles have been received by the NRF. In this case, without the proposed solution, the consumer NF or SCP iterates through all NFs identified in the response message, gets the NF profile from the NRF for each NF, and runs logic to compare the received data with the stored NF profile. This requires requesting NF profile data for all 1,000 NF profiles, for comparison. In contrast, with the proposed synchronization logic, iteration through the HTTP header is performed to find the X NF profiles that have a change in version number. The consumer NF or SCP then queries the NRF for the NF instances that are determined to have a change in version number. The result is a savings of processing at the consumer NF or SCP and a savings in network bandwidth.

The final row in Table 2 illustrates the case where there are X profiles deleted from the NRF. Without the proposed solution, the computing includes comparing NF profiles stored by the NF to the list of URIs from the NRF to find NF instances that are missing from the list. With the proposed solution, the value of the number of NF profiles variable stored in the local NF topology database is compared with the x-nf-topology-level variable, which indicates the number of NF profile identifiers in the HTTP header, to determine whether NF profiles have been deregistered with the NRF. If the number of NF instances in the header is smaller than the number of NF instances in the database, the header is searched using the NF instance identifiers in the database to identify the NF instance identifiers in the database that are not present in the header. No parsing of NF profiles is required, resulting in NF processing savings.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network function (NF) topology synchronization, the method comprising:
   at a network node including at least one processor:
      maintaining NF instance identifiers and corresponding NF profile version identifiers in an NF topology database local to the network node, the NF profile version identifiers indicating most current NF profile versions stored by the network node for each NF instance identifier;
      obtaining a list of NF instance identifiers and NF profile version identifiers from an NF repository function (NRF);
      accessing the NF topology database using the NF instance identifiers in the list;
      determining, by comparing the NF profile version identifiers in the list with NF profile version identifiers for corresponding NF instance identifiers in the NF topology database, whether the NF profiles stored by the network node are lagging behind the NF profiles stored by the NRF;
      auditing the NRF for updated NF profiles for NFs whose NF profiles stored by the network node are lagging behind the NF profiles stored by the NRF; and
      refraining from auditing the NRF for updated NF profiles for NFs whose NF profiles stored by the network node are the same as or more current than the NF profiles stored by the NRF.

2. The method of claim 1 wherein the network node comprises at least one of a consumer NF and a service communications proxy (SCP).

3. The method of claim 1 wherein obtaining the list of NF instance identifiers and NF profile version identifiers from the NRF includes sending a GET/nf-instances message from the network node to the NRF and receiving the list of NF instance identifiers and NF profile version identifiers in response to the GET/nf-instances message.

4. The method of claim 3 wherein receiving the list of NF instance identifiers and NF profile version identifiers includes receiving the list in a hypertext transfer protocol (HTTP) header.

5. The method of claim 1 wherein auditing the NRF includes sending a GET/nf instances message to the NRF specifying the NF instance identifier of the NF whose NF profile is determined to be lagging behind the NF profile stored by the NRF.

6. The method of claim 1 comprising detecting NF instance identifiers in the list that are not in the NF topology database and querying the NRF to obtain NF profiles for the NF identifiers in the list that are not in the NF topology database.

7. The method of claim 1 comprising detecting that the NF topology database includes NF instance identifiers that are not present in the list, and, in response, deleting records for the NF instance identifiers that are not in the list from the NF topology database.

8. The method of claim 1 wherein the NF profile version identifiers comprise timestamps indicative of times of receipt of NF profiles by the NRF.

9. The method of claim 1 comprising maintaining, at the network node, a sync version that indicates a highest NF profile version number learned by the network node from an NF topology audit and wherein accessing the NF topology database using the instance identifiers in the list includes accessing the NF topology database using only NF instance identifiers that are greater than or equal to the sync version minus a tolerance.

10. The method of claim 1 comprising maintaining, in the NRF, an NF topology database including NF instance identifiers and NF profile version identifiers that indicate the most current NF profile versions stored by the NRF.

11. A system for network function (NF) topology synchronization, the system comprising:
   a network node including at least one processor;
      an NF topology database local to the network node and storing NF instance identifiers and corresponding NF profile version identifiers, the NF profile version identifiers indicating most current NF profile versions stored by the network node for each NF instance identifier; and
      an NF topology synchronizer executed by the at least one processor for obtaining a list of NF instance identifiers and NF profile version identifiers from an NF repository function (NRF), accessing the NF topology database using the NF instance identifiers in the list, determining, by comparing the NF profile version identifiers in the list with NF profile version identifiers for corresponding NF instance identifiers in the NF topology database, whether the NF profiles stored by the network node are lagging behind the NF profiles stored by the NRF, auditing the NRF for updated NF profiles for NFs whose NF profiles stored by the network node are lagging behind the NF profiles stored by the NRF, and refraining from auditing the NRF for updated NF profiles for NFs whose NF profiles stored by the network node are the same as or more current than the NF profiles stored by the NRF.

12. The system of claim 11 wherein the network node comprises a service communications proxy (SCP).

13. The system of claim 11 wherein the network node comprises a consumer NF.

14. The system of claim 11 wherein the NF topology synchronizer is configured to obtain the list of NF instance identifiers and NF profile version identifiers from the NRF by sending a GET/nf-instances message from the network node to the NRF and receive the list of NF instance identifiers and NF profile version identifiers in response to the GET/nf-instances message.

15. The system of claim 14 wherein the NF topology synchronizer is configured to receive the list in a hypertext transfer protocol (HTTP) header.

16. The system of claim 11 wherein the NF topology synchronizer is configured to detect NF instance identifiers in the list that are not in the NF topology database and querying the NRF to obtain NF profiles for the NF identifiers in the list that are not in the NF topology database.

17. The system of claim 11 wherein the NF topology synchronizer is configured to detect that the NF topology database includes NF instance identifiers that are not present in the list, and, in response, delete records for the NF instance identifiers that are not in the list from the NF topology database.

18. The system of claim 11 wherein the NF profile version identifiers comprise timestamps indicative of times of receipt of NF profiles by the NRF.

19. The system of claim 11 wherein the NF topology synchronizer is configured to obtain the list of NF instance identifiers and NF profile version identifiers from an NF topology database maintained by the NRF.

20. A non-transitory computer readable medium having stored thereon executable instructions that when executed by a processor of a computer controls the computer to perform steps comprising;

at a network node including at least one processor:

maintaining network function (NF) instance identifiers and corresponding NF profile version identifiers in an NF topology database local to the network node, the NF profile version identifiers indicating most current NF profile versions stored by the network node for each NF instance identifier;

obtaining a list of NF instance identifiers and NF profile version identifiers from an NF repository function (NRF);

accessing the NF topology database using the NF instance identifiers in the list;

determining, by comparing the NF profile version identifiers in the list with NF profile version identifiers for corresponding NF instance identifiers in the NF topology database, whether the NF profiles stored by the network node are lagging behind the NF profiles stored by the NRF;

auditing the NRF for updated NF profiles for NFs whose NF profiles stored by the network node are lagging behind the NF profiles stored by the NRF; and refraining from auditing the NRF for updated NF profiles for NFs whose NF profiles stored by the network node are the same as or more current than the NF profiles stored by the NRF.

\* \* \* \* \*

UNITED STATES PATENT AND TRADEMARK OFFICE
CERTIFICATE OF CORRECTION

| | | |
|---|---|---|
| PATENT NO. | : 10,833,938 B1 | Page 1 of 1 |
| APPLICATION NO. | : 16/527988 | |
| DATED | : November 10, 2020 | |
| INVENTOR(S) | : Rajput et al. | |

It is certified that error appears in the above-identified patent and that said Letters Patent is hereby corrected as shown below:

On the Title Page

On page 2, Column 2, Item (56) under Other Publications, Line 11, delete "(Unpubllshed," and insert -- (Unpublished, --, therefor.

In the Drawings

On sheet 5 of 11, in FIG. 5, Line 11, delete "DELET" and insert -- DELETE --, therefor.

On sheet 8 of 11, in FIG. 8, Line 21, delete "NOTIFICAION." and insert -- NOTIFICATION. --, therefor.

In the Specification

In Column 2, Line 62, delete "of the of the" and insert -- of the --, therefor.

In Column 3, Line 3, delete "tolerance" and insert -- tolerance. --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*